US010334572B2

(12) United States Patent
Hebert et al.

(10) Patent No.: US 10,334,572 B2
(45) Date of Patent: Jun. 25, 2019

(54) SYSTEMS AND METHODS FOR EMULATING UPLINK DIVERSITY SIGNALS

(71) Applicant: CommScope Technologies LLC, Hicktory, NC (US)

(72) Inventors: Thomas G. Hebert, Savage, MN (US); Jeffrey J. Cannon, Victoria, MN (US); Dean Zavadsky, Shakopee, MN (US); Philip M. Wala, Savage, MN (US); Jody Forland, St. Bonifacius, MN (US)

(73) Assignee: CommScope Technologies LLC, Hickory, NC (US)

( * ) Notice: Subject to any disclaimer, the term of this patent is extended or adjusted under 35 U.S.C. 154(b) by 303 days.

(21) Appl. No.: 15/016,592

(22) Filed: Feb. 5, 2016

(65) Prior Publication Data

US 2016/0234832 A1 Aug. 11, 2016

Related U.S. Application Data

(60) Provisional application No. 62/112,523, filed on Feb. 5, 2015.

(51) Int. Cl.
   *H04B 1/04* (2006.01)
   *H04B 1/40* (2015.01)
   (Continued)

(52) U.S. Cl.
   CPC ...... *H04W 72/0413* (2013.01); *H04B 1/0475* (2013.01); *H04B 1/40* (2013.01); *H04W 88/085* (2013.01)

(58) Field of Classification Search
   None
   See application file for complete search history.

(56) References Cited

U.S. PATENT DOCUMENTS

| 3,685,047 A | 8/1972 | Sherer et al. |
| 4,697,236 A | 9/1987 | Butts et al. |

(Continued)

FOREIGN PATENT DOCUMENTS

| GB | 2354674 | 3/2001 |
| WO | 9944308 A1 | 9/1999 |

(Continued)

OTHER PUBLICATIONS

International Search Authority, "International Search Report and Written Opinion for PCT Application No. PCT/US2016/016118", "from Foreign Counterpart to U.S. Appl. No. 15/016,592", dated Jun. 13, 2016, pp. 1-13, Published in: WO.

(Continued)

*Primary Examiner* — Robert M Morlan
(74) *Attorney, Agent, or Firm* — Fogg & Powers LLC

(57) ABSTRACT

A signal interface unit for interfacing uplink downstream signals from a downstream device with an upstream device includes at least one upstream interface configured to communicate a primary uplink upstream signal and at least one emulated-diversity uplink upstream signal to an upstream device; a downstream interface configured to receive an uplink downstream signal from a downstream device; wherein the signal interface unit is configured to convert the uplink downstream signal into the primary uplink upstream signal; wherein the signal interface unit is further configured to generate the at least one emulated-diversity uplink upstream signal from at least one of the primary uplink upstream signal and the uplink downstream signal.

41 Claims, 15 Drawing Sheets

(51) Int. Cl.
*H04W 72/04* (2009.01)
*H04W 88/08* (2009.01)

(56) References Cited

U.S. PATENT DOCUMENTS

| | | | |
|---|---|---|---|
| 5,280,472 | A | 1/1994 | Gilhousen et al. |
| 5,519,691 | A | 5/1996 | Darcie et al. |
| 5,969,837 | A | 10/1999 | Farber et al. |
| 6,801,767 | B1 | 10/2004 | Schwartz et al. |
| 7,103,377 | B2 | 9/2006 | Bauman et al. |
| 7,171,244 | B2 | 1/2007 | Bauman |
| 7,184,728 | B2 | 2/2007 | Solum |
| 7,590,354 | B2 | 9/2009 | Sauer et al. |
| 7,599,711 | B2 | 10/2009 | Hermel et al. |
| 7,627,250 | B2 | 12/2009 | George et al. |
| 7,688,135 | B2 | 3/2010 | Kim et al. |
| 7,787,854 | B2 | 8/2010 | Conyers et al. |
| 7,805,073 | B2 | 9/2010 | Sabat, Jr. et al. |
| 7,848,654 | B2 | 12/2010 | Sauer et al. |
| 7,961,689 | B2 | 6/2011 | Stratford |
| 8,010,116 | B2 | 8/2011 | Scheinert |
| 8,050,291 | B1 | 11/2011 | Prasad et al. |
| 8,064,850 | B2 | 11/2011 | Yang et al. |
| 8,111,998 | B2 | 2/2012 | George et al. |
| 8,149,950 | B2 | 4/2012 | Kim et al. |
| 8,224,266 | B2 | 7/2012 | Liu et al. |
| 8,274,332 | B2 | 9/2012 | Cho et al. |
| 8,310,963 | B2 | 11/2012 | Singh |
| 8,326,238 | B2 | 12/2012 | Yang et al. |
| 8,346,091 | B2 | 1/2013 | Kummertz et al. |
| 8,351,877 | B2 | 1/2013 | Kim et al. |
| 8,380,143 | B2 | 2/2013 | Yang et al. |
| 8,401,499 | B2 | 3/2013 | Kim et al. |
| 8,467,747 | B2 | 6/2013 | Kim et al. |
| 8,472,897 | B1 | 6/2013 | Yang |
| 8,750,913 | B2 * | 6/2014 | Khayrallah ......... H04B 7/0691 370/339 |
| 2001/0046840 | A1 | 11/2001 | Kim |
| 2003/0045284 | A1 | 3/2003 | Copley et al. |
| 2004/0125897 | A1 | 6/2004 | Ariyavisitakul et al. |
| 2005/0111475 | A1 | 5/2005 | Borkowski et al. |
| 2006/0172775 | A1 | 8/2006 | Conyers et al. |
| 2006/0233188 | A1 | 10/2006 | Oliver et al. |
| 2006/0253872 | A1 | 11/2006 | Shoji et al. |
| 2007/0241812 | A1 | 10/2007 | Yang et al. |
| 2008/0014948 | A1 | 1/2008 | Scheinert |
| 2008/0058018 | A1 | 3/2008 | Scheinert |
| 2008/0075158 | A1 | 3/2008 | Li |
| 2008/0144737 | A1 | 6/2008 | Naguib |
| 2008/0174365 | A1 | 7/2008 | Yang et al. |
| 2008/0174502 | A1 | 7/2008 | Oren et al. |
| 2008/0265996 | A1 | 10/2008 | Kim et al. |
| 2008/0284509 | A1 | 11/2008 | Kim et al. |
| 2009/0054105 | A1 | 2/2009 | Hermel |
| 2009/0085658 | A1 | 4/2009 | Liu et al. |
| 2009/0096521 | A1 | 4/2009 | Liu et al. |
| 2009/0238573 | A1 | 9/2009 | Bauman |
| 2009/0285194 | A1 | 11/2009 | Kim et al. |
| 2009/0307739 | A1 | 12/2009 | Dean et al. |
| 2010/0135437 | A1 | 6/2010 | Lee et al. |
| 2010/0177760 | A1 | 7/2010 | Cannon et al. |
| 2010/0271957 | A1 | 10/2010 | Stapleton et al. |
| 2010/0278530 | A1 | 11/2010 | Kummetz et al. |
| 2010/0296816 | A1 | 11/2010 | Larsen |
| 2011/0063169 | A1 | 3/2011 | Chen et al. |
| 2011/0135013 | A1 | 6/2011 | Wegener |
| 2011/0156815 | A1 | 6/2011 | Kim et al. |
| 2011/0158081 | A1 | 6/2011 | Wang et al. |
| 2011/0194548 | A1 | 8/2011 | Feder et al. |
| 2011/0217937 | A1 | 9/2011 | Cook |
| 2011/0268449 | A1 | 11/2011 | Berlin et al. |
| 2012/0039254 | A1 | 2/2012 | Stapleton et al. |
| 2012/0039320 | A1 | 2/2012 | Lemson et al. |
| 2012/0057572 | A1 | 3/2012 | Evans et al. |
| 2012/0069880 | A1 | 3/2012 | Lemson et al. |
| 2012/0135695 | A1 | 5/2012 | Yang et al. |
| 2012/0147993 | A1 | 6/2012 | Kim et al. |
| 2012/0154038 | A1 | 6/2012 | Kim et al. |
| 2012/0155572 | A1 | 6/2012 | Kim et al. |
| 2012/0213164 | A1 | 8/2012 | Zuckerman et al. |
| 2012/0230382 | A1 | 9/2012 | Kim et al. |
| 2012/0263152 | A1 | 10/2012 | Fischer et al. |
| 2012/0281565 | A1 | 11/2012 | Sauer |
| 2012/0281622 | A1 | 11/2012 | Saban et al. |
| 2013/0009707 | A1 | 1/2013 | Kim et al. |
| 2013/0077713 | A1 | 3/2013 | Kim et al. |
| 2013/0094612 | A1 | 4/2013 | Kim et al. |
| 2013/0100948 | A1 * | 4/2013 | Irvine ................. H04J 3/0632 370/350 |
| 2013/0114486 | A1 | 5/2013 | Spedaliere et al. |
| 2013/0114963 | A1 | 5/2013 | Stapleton et al. |
| 2013/0128810 | A1 | 5/2013 | Lee et al. |
| 2013/0147550 | A1 | 6/2013 | Yang et al. |
| 2013/0195467 | A1 | 8/2013 | Schmid et al. |
| 2014/0146797 | A1 | 5/2014 | Zavadsky et al. |
| 2014/0146906 | A1 | 5/2014 | Zavadsky et al. |
| 2014/0198684 | A1 * | 7/2014 | Gravely ............... H04W 24/02 370/254 |
| 2015/0098419 | A1 | 4/2015 | Zavadsky et al. |

FOREIGN PATENT DOCUMENTS

| | | |
|---|---|---|
| WO | 2004054290 A1 | 6/2004 |
| WO | 2008076432 | 6/2008 |
| WO | 2010133942 | 11/2010 |
| WO | 2011142893 | 11/2011 |
| WO | 2011156465 | 12/2011 |
| WO | 2012115843 | 8/2012 |
| WO | 2014040608 | 3/2014 |
| WO | 2014127317 A1 | 8/2014 |

OTHER PUBLICATIONS

U.S. Patent and Trademark Office, "Notice of Allowance", "U.S. Appl. No. 12/814,896", dated Jan. 24, 2013, pp. 1-14.
U.S. Patent and Trademark Office, "Office Action", "U.S. Appl. No. 12/814,896", dated Aug. 23, 2012, pp. 1-34.
International Preliminary Examining Authority, "International Preliminary Report on Patentability", "from Foreign Counterpart of U.S. Appl. No. 12/814,896", dated Dec. 27, 2012, pp. 1-6, Published in: WO.
International Searching Authority, "International Search Report and Written Opinion", "from Foreign Counterpart of U.S. Appl. No. 12/814,896", dated Jan. 17, 2012, pp. 1-10, Published in: WO.
International Searching Authority, "International Search Report and Written Opinion from PCT Application No. PCT/US2013/071960 dated Mar. 14, 2014", "from PCT Counterpart of U.S. Appl. No. 14/090,129", Mar. 14, 2014, pp. 1-13, Published in: WO.
International Searching Authority, "International Search Report and Written Opinion from PCT Application No. PCT/US2013/071967 dated Mar. 10, 2014", "from PCT Counterpart of U.S. Appl. No. 14/090,135", dated Mar. 10, 2014, pp. 1-9, Published in: WO.
Korean Intellectual Property Office, "International Search Report and Written Opinion from PCT Application No. PCT/US2013/071977 dated Mar. 20, 2014", "from PCT Counterpart of U.S. Appl. No. 14/090,139", dated Mar. 20, 2014, pp. 1-14, Published in: WO.
International Search Authority, "International Search Report and Written Opinion for Application Serial No. PCT/US2014/059371", "from Foreign Counterpart of U.S. Appl. No. 14/506,145", dated Jan. 19, 2015, pp. 1-11, Published in: WO.
"Intel Heterogeneous Network Solution Brief", "Published as early as 2011", , pp. 1-5, Publisher: Intel Corporation.
European Patent Office, "Extended European Search Report from EP Application No. 16747318.0 dated Aug. 21, 2018" From Foreign Counterpart of U.S. Appl. No. 15/016,592; pp. 1-9; Published in EP.

* cited by examiner

SYSTEMS AND METHODS FOR EMULATING UPLINK DIVERSITY SIGNALS

CROSS-REFERENCE TO RELATED APPLICATIONS

This application claims the benefit of U.S. Provisional Patent Application Ser. No. 62/112,523 filed on Feb. 5, 2015, which is hereby incorporated herein by reference.

This application is related to the following co-pending United States patent application, which is hereby incorporated herein by reference:

U.S. patent application Ser. No. 14/506,145 entitled "SYSTEMS AND METHODS FOR NOISE FLOOR OPTIMIZATION IN DISTRIBUTED ANTENNA SYSTEM WITH DIRECT DIGITAL INTERFACE TO BASE STATION" filed on Oct. 3, 2014 (published as U.S. Patent Application Publication No. 2015/0098419), which is hereby incorporated herein by reference.

BACKGROUND

Distributed Antenna Systems (DAS) are used to distribute wireless signal coverage into buildings or other substantially closed environments. The antennas are typically connected to a radio frequency (RF) signal source, such as a service provider's base station. Various methods of transporting the RF signal from the RF signal source to the antenna have been implemented in the art.

SUMMARY

A signal interface unit for interfacing uplink downstream signals from a downstream device with an upstream device includes at least one upstream interface configured to communicate a primary uplink upstream signal and at least one emulated-diversity uplink upstream signal to an upstream device; a downstream interface configured to receive an uplink downstream signal from a downstream device; wherein the signal interface unit is configured to convert the uplink downstream signal into the primary uplink upstream signal; wherein the signal interface unit is further configured to generate the at least one emulated-diversity uplink upstream signal from at least one of the primary uplink upstream signal and the uplink downstream signal.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1A:
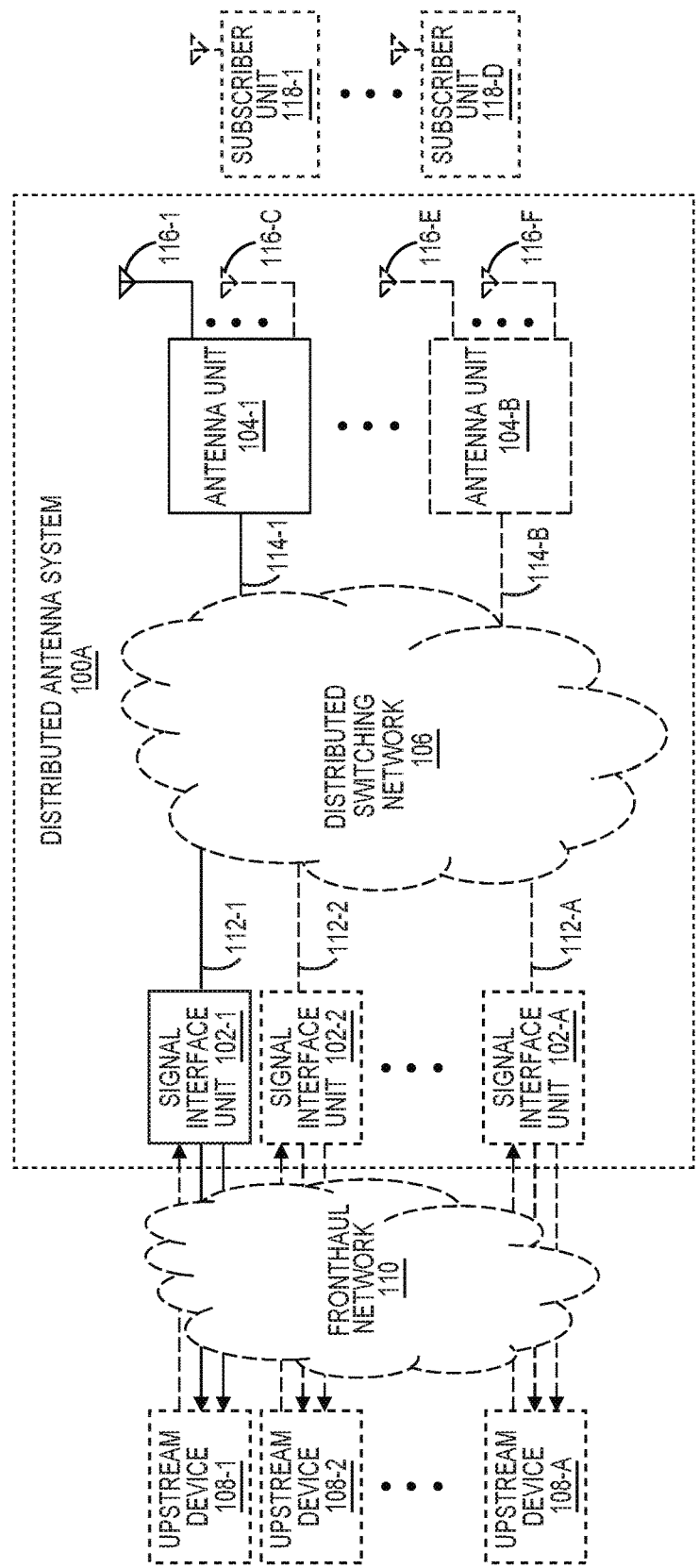
FIGS. 1A-1D are block diagrams of exemplary embodiments of distributed antenna systems.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe a signal interface unit for interfacing uplink downstream signals from at least one downstream device with an upstream device. Specifically, the signal interface unit generates at least one emulated-diversity uplink upstream signal in addition to a primary uplink upstream signal based on a single uplink downstream signal provided to it by a downstream device. The upstream device expects at least one diversity signal, but only a single uplink downstream signal is being provided from the downstream device. Described herein is methodology for emulating the at least one diversity signal expected by the upstream device. The techniques described herein are useful in connection with the distribution of wireless communications that use licensed radio frequency spectrum, such as cellular radio frequency communications utilizing various radio access technologies (RAT). In exemplary embodiments, radio access technologies (RAT) may operate using various wireless protocols and in various bands of frequency spectrum. The systems and methodologies described herein apply equally to a number of radio access technologies (RAT) where diversity signals are expected at an upstream device. For example, the radio access technologies (RAT) may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 3100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), Wideband Code Division Multiple Access (W-CDMA), 3100 MHz Universal Mobile Telecommunications System (UMTS), Universal Mobile Telecommunications System Frequency-Division Duplexing (UMTS-FDD), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

In exemplary embodiments, the signal interface unit is communicatively coupled to at least one component of a distributed antenna system which is coupled to at least one antenna unit. In other embodiments, the signal interface unit is directly coupled with the antenna unit or is included with the antenna unit in a single device. While exemplary embodiments are described in the context of distributed antenna systems (DAS) within this description, it is understood that exemplary embodiments also apply in cloud radio access networks (C-RAN) and/or hybrid DAS/C-RAN systems. In exemplary embodiments, the signal interface unit is communicatively coupled to at least one upstream device, such as a base station, either directly or through a fronthaul network. In exemplary embodiments, the signal interface unit is at least one of a Common Public Radio Interface (CPRI) base station interface, an Open Base Station Architecture Initiative (OBSAI) base station interface, and an Open Radio Interface (ORI) base station interface. The signal interface acts as a translator to translate uplink and downlink signals between an upstream device and a downstream device (such as a component of a distributed antenna system, a remote radio head, and/or an antenna). The signal interface also generates the at least one emulated-diversity uplink upstream signal based on the single uplink downstream signal provided by the downstream device. In exemplary embodiments, the signal interface generates the at least one emulated-diversity uplink upstream signal by adjusting/modifying attributes of a copy of the single uplink downstream signal and reports characteristics to the upstream device in such a way as to cause the antenna system to look like a diversity reception antenna system to the upstream device. In exemplary embodiments, the at least one emulated-diversity uplink upstream signal includes a plurality of emulated-diversity uplink upstream signals. In exemplary embodiments, the primary uplink upstream signal along with a plurality of emulated-diversity uplink upstream signals emulate signals from a Multiple-Input and Multiple-Output (MIMO) system, such as a 4×4 MIMO system. In exemplary embodiments, this enables the suppression of alarms in the upstream device that would otherwise trigger if the upstream device could not identify each expected MIMO signal.

In exemplary embodiments, the upstream device expects uplink downstream signals from two or more antennas for diversity purposes. In exemplary embodiments, the upstream device includes functionality to compare attributes/aspects/parameters of a primary uplink upstream signal and at least one diversity uplink downstream signal to determine whether the two signals appear to be coming from different antennas as expected. In exemplary embodiments, the upstream device is also configured to compare attributes/aspects/parameters of the at least one diversity uplink downstream signal with attributes/aspects of the primary uplink upstream signal to determine whether the two signals are distinct enough to be considered diversity signals. In exemplary embodiments, the upstream device is also configured to compare attributes/aspects/parameters of the at least one diversity uplink downstream signal with attributes/aspects/parameters of the primary uplink upstream signal to determine whether the two signals are too distinct to be considered diversity signals. In exemplary embodiments, the upstream device is configured to trigger an alarm if the at least one diversity uplink downstream signal is either too distinct or not distinct enough from the primary uplink upstream signal. In exemplary embodiments, the alarm is only triggered if the at least one diversity uplink downstream signal is either too distinct or not distinct enough from the primary uplink upstream signal for a certain period of time (such as a continuous period of time or an aggregate period of time). In exemplary embodiments, the alarm is a diversity imbalance alarm that is triggered if the two signals are more than a predefined quantity of decibels (dB) apart (such as 5 dB apart in some embodiments) over some statistical window of time. In exemplary embodiments, the upstream device is configured to correlate the at least one diversity uplink downstream signal with the primary uplink upstream signal to determine how closely they correlate in at least one of power, amplitude, delay, and/or noise.

In exemplary embodiments, the signal interface generates at least one emulated-diversity uplink upstream signal in such a way so as to comply with the requirements for diversity being checked by the upstream device. In exemplary embodiments, these adjustments/modifications include adjusting/modifying the amplitude, the power, the delay, and/or the noise characteristics of the at least one emulated-diversity uplink upstream signal to cause the upstream device to determine that the at least one emulated-diversity uplink upstream signal is distinct enough from the primary uplink upstream signal to come from a separate diversity antenna (even though in reality both are derived from the same uplink downstream signal). In exemplary embodiments, the requirements for diversity relate to the spacing/distance between a plurality of antennas used in a diversity reception system, which could be measured in wavelengths based on the radio frequency being transmitted. In exemplary embodiments, the requirements for diversity result in statistics regarding differences between the primary uplink upstream signal and the at least one diversity uplink downstream signal.

In exemplary embodiments, the antenna unit is multi-standard and capable of receiving at least one signal, converting it to radio frequency (RF), and transmitting the RF signal using at least one antenna. In exemplary embodiments, the antenna unit is not specific to a number of channels or an air protocol and does not necessarily require any hardware change when channels are added or removed, or a new modulation type or air protocol is used. In exemplary embodiments, the signals communicated with the upstream device are channelized signals, which are specific to a particular channel. In exemplary embodiments, the channelized signals are baseband data, such as channelized in-phase (I) and quadrature (Q) data in I/Q pairs. The channelized signals are not positioned relative to one another and require additional baseband conversion before RF conversion and transmission can be performed. Specifically, if channelized signals are communicated to an antenna unit, additional processing would be required at the antenna unit to convert the channelized signals before RF conversion and transmission.

FIGS. 1A-1D are block diagrams of exemplary embodiments of distributed antenna systems 100. Each of FIGS. 1A-1D illustrates a different embodiment of a distributed antenna system, labeled 100A-100D respectively.

FIG. 1A is a block diagram of an exemplary embodiment of a distributed antenna system 100A. Distributed antenna system 100A includes at least one signal interface unit 102 (including signal interface unit 102-1, optional signal interface unit 102-2, and any amount of optional signal interface units 102 through optional signal interface unit 102-A), at least one antenna unit 104 (including antenna unit 104-1 and any amount of optional antenna units 104 through optional antenna unit 104-B), and an optional distributed switching network 106.

Each signal interface unit 102 is communicatively coupled to a corresponding upstream device 108 directly or through a corresponding optional fronthaul network 110. Each upstream device 108 is configured to provide signals to be transported through the distributed antenna system 100A to each corresponding signal interface unit 102. In the forward path, each signal interface unit 102 is configured to receive signals from at least one upstream device 108. In specific embodiments, signal interface unit 102-1 is communicatively coupled to upstream device 108-1 through optional fronthaul network 110, optional signal interface unit 102-2 is communicatively coupled to optional upstream device 108-2 through optional fronthaul network 110, and optional signal interface unit 102-A is communicatively coupled to optional upstream device 108-A through optional fronthaul network 110. In exemplary embodiments, the optional fronthaul network 110 includes one or more intermediary devices positioned between the signal interface unit 102 and its corresponding upstream device 108. In exemplary embodiments, the one or more intermediary devices in the optional fronthaul network 110 are configured to convert channelized uplink signals received from the at least one signal interface unit 102-1 into an uplink output for the upstream device, such as a CPRI and/or OBSAI link. In exemplary embodiments, the one or more intermediary devices in the optional fronthaul network 110 multiplex multiple channels into one or more upstream links (such as upstream CPRI links). In exemplary embodiments, any number of channels can be multiplexed into any (equal or smaller) number of CPRI links in the optional fronthaul network 110 and be communicated to the at least one upstream device 108 (such as one or more base stations).

In exemplary embodiments, each signal interface unit 102 is also communicatively coupled to the optional distributed switching network 106 across a communication link 112. Specifically, signal interface unit 102-1 is communicatively coupled to the optional distributed switching network 106 across communication link 112-1, optional signal interface unit 102-2 is communicatively coupled to the optional distributed switching network 106 across communication link 112-2, and optional signal interface unit 102-A is communicatively coupled to the optional distributed switching network 106 across communication link 112-A. As described in more detail below, each signal interface unit 102 is configured to convert first downlink signals from the upstream device 108 to which it is communicatively coupled into second downlink signals. In exemplary embodiments, each signal interface unit 102 is configured to communicate the second downlink signals to at least one antenna unit 104 either directly or though optional distributed switching network 106 or other components of the distributed antenna system 100A across a respective communication link 112.

Similarly in the reverse path, in exemplary embodiments each signal interface unit 102 is configured to receive an uplink downstream signal across a respective communication link 112 from an antenna unit 104, either directly or through optional distributed switching network 106. In exemplary embodiments, the uplink downstream signal is a distributed antenna system uplink signal having a transport format used by a distributed antenna system, such as a digital distributed antenna system transport format or a full band (at radio frequency or intermediate frequency) analog distributed antenna system transport format. In exemplary embodiments, the uplink downstream signal includes one or more channels from at least one antenna unit 104.

In exemplary embodiments, at least one signal interface unit 102 is further configured to convert the received uplink downstream signal into a primary uplink upstream signal and to generate at least one emulated-diversity uplink upstream signal from at least one of the primary uplink upstream signal and the uplink downstream signal. In exemplary embodiments, the primary uplink upstream signal is a channelized uplink signal having a transport format used by a base station, such as digital baseband I/Q samples or analog single channel (at radio frequency or intermediate frequency).

In exemplary embodiments, the at least one emulated-diversity uplink upstream signal includes a plurality of emulated-diversity uplink upstream signals. In exemplary embodiments, the primary uplink upstream signal and the at least one emulated-diversity uplink upstream signal are formatted for the associated upstream device 108. In exemplary embodiments, the at least one signal interface unit 102 is further configured to communicate the primary uplink upstream signal and the at least one emulated-diversity uplink upstream signal to the associated upstream device 108 directly or across the optional fronthaul network 110. In exemplary embodiments, both the primary uplink upstream signal and the at least one emulated-diversity uplink upstream signal are communicated from the at least one signal interface unit 102 to the associated upstream device 108 using a single communication medium. In exemplary embodiments, the at least one signal interface unit 102 is configured to communicate the primary uplink upstream signal to the associated upstream device 108-1 using a first communication link and the at least one signal interface unit 102 is configured to communicate the at least one emulated-diversity uplink upstream signal to the associated upstream device 108-2 using a second communication link distinct from the first communication link. In exemplary embodiments where the at least one emulated-diversity uplink upstream signal includes a plurality of emulated-diversity uplink upstream signals, each of the plurality of emulated-diversity uplink upstream signals is communicated to the associated upstream device 108 using a separate communication link distinct from all the other emulated-diversity uplink upstream signals. In other exemplary embodiments, some or all of the plurality of emulated-diversity uplink upstream signals are communicated using a single communication link.

In exemplary embodiments, the at least one signal interface unit 102 is configured to generate the at least one emulated-diversity uplink upstream signal by being configured to: (1) copy the primary uplink upstream signal to create the at least one emulated-diversity uplink upstream signal; and (2) adjust at least one attribute of the at least one emulated-diversity uplink upstream signal such that the at least one emulated-diversity uplink upstream signal is distinct from the primary uplink upstream signal. In exemplary embodiments, the at least one attribute includes at least one gain, power, delay, and noise. In exemplary embodiments, adjusting at least one attribute of the at least one emulated-diversity uplink upstream signal includes digitally adjusting the at least one attribute. In exemplary embodiments, the at least one attribute is adjusted so that the at least one emulated-diversity uplink upstream signal is different enough from the primary uplink upstream signal, so that the upstream device 108 doesn't determine that the at least one emulated-diversity uplink upstream signal as too similar or too dissimilar to the primary uplink upstream signal. In exemplary embodiments, the upstream device 108 includes functionality to compare the primary uplink upstream signal and the at least one emulated-diversity uplink upstream signal to determine whether they meet certain criteria relative to one another that would cause them to more likely be authentic diversity signals. In exemplary embodiments, the signal interface unit 102 intentionally masks the fact that the at least one emulated-diversity uplink upstream signal is generated by copying and adjusting the attributes of the primary uplink upstream signal to avoid the upstream device 108 from determining that the at least one emulated-diversity uplink upstream signal is not different enough from the primary uplink upstream signal.

In exemplary embodiments, the at least one signal interface unit 102 is configured to generate the at least one emulated-diversity uplink upstream signal by being configured to: (1) copy the primary uplink upstream signal to create the at least one emulated-diversity uplink upstream signal; (2) adjust gain of the at least one emulated-diversity uplink upstream signal; (3) adjust delay of the at least one emulated-diversity uplink upstream signal; and (4) adjust noise of the at least one emulated-diversity uplink upstream signal. In other exemplary embodiments, the at least one signal interface unit 102 is configured to generate at least one emulated-diversity uplink upstream signal by being configured to: (1) copy the uplink downstream signal into a duplicate uplink downstream signal; (2) adjust at least one attribute of the duplicate uplink downstream signal; and (3) convert the duplicate uplink downstream signal into the at least one emulated-diversity uplink upstream signal. In exemplary embodiments, the copying, adjusting, and/or converting steps are combined together and/or performed in different orders. In other embodiments, the at least one emulated-diversity uplink upstream signal is generated in other ways.

In exemplary embodiments, each of the plurality of emulated-diversity uplink upstream signals is generated such that all of the plurality of emulated-diversity uplink upstream signals are distinct from each other and the primary uplink upstream signal. In exemplary embodiments, the at least one signal interface unit 102 is configured to convert the uplink downstream signal into the primary uplink upstream signal by converting between two distinct framing structures. In exemplary embodiments, at least one of the uplink downstream signal and the primary uplink upstream signal includes I/Q pairs. In exemplary embodiments, the at least one signal interface unit 102 is configured to convert the uplink downstream signal into the primary uplink upstream signal by converting from a first baseband representation to a second baseband representation. In exemplary embodiments, the at least one signal interface unit 102 is configured to convert the uplink downstream signal into the primary uplink upstream signal by converting from an analog signal into a digital signal.

In exemplary embodiments, the upstream device 108 is a base station configured to receive the primary uplink upstream signal and the at least one emulated-diversity uplink upstream signal. In exemplary embodiments, the primary uplink upstream signal and the at least one emulated-diversity uplink upstream signal are formatted according to at least one of a Common Public Radio Interface (CPRI) standard, an Open Base Station Architecture Initiative (OBSAI) standard, and an Open Radio Interface (ORI) standard. In exemplary embodiments, the upstream device 108 is one of a Common Public Radio Interface (CPRI) device interface, an Open Base Station Architecture Initiative (OBSAI) device interface, and an Open Radio Interface (ORI) device interface. In other exemplary embodiments, the upstream device 108 is an analog base station that is configured to receive either intermediate frequency analog signals or radio frequency analog signals from the at least one signal interface unit 102. In these exemplary embodiments, the primary uplink upstream signal and the at least one emulated-diversity uplink upstream signal that are communicated to the upstream device 108 are either intermediate frequency analog signals or radio frequency analog signals. In exemplary embodiments, the base station includes a dual diversity demodulator.

In exemplary embodiments, at least one alarm is triggered by the upstream device 108 if the primary uplink upstream signal is either too similar or too dissimilar from the at least one emulated-diversity uplink upstream signal. In exemplary embodiments, at least one alarm is triggered by the upstream device 108 if at least a second attribute of the primary uplink upstream signal differs from the at least one attribute of the at least one emulated-diversity uplink upstream signal by more than a first threshold. In exemplary embodiments, at least one alarm is triggered by the upstream device 108 if at least a second attribute of the primary uplink upstream signal differs from the at least one attribute of the at least one emulated-diversity uplink upstream signal by less than a second threshold. In exemplary embodiments, at least one alarm is triggered by the upstream device 108 if at least a second attribute of the primary uplink differs from the at least one attribute of the at least one emulated-diversity uplink upstream signal by more than a first threshold or less than a second threshold.

In exemplary embodiments where at least one component of the distributed antenna system 100A is downstream from the at least one signal interface 102, the at least one component of the distributed antenna system 100A provides the uplink downstream signal to the at least one signal interface unit 102. In exemplary embodiments, the distributed antenna system 100A is a digital distributed antenna system including an antenna unit 104 configured to: (1) receive radio frequency signals from a subscriber unit 118; (2) convert the radio frequency signals into digital signals; and (3) communicate the digital signals through the distributed antenna system 100A and toward the signal interface unit 102.

In exemplary embodiments, the distributed antenna system 100A is a hybrid distributed antenna system including: (A) an antenna unit 104 configured to: (1) receive radio frequency signals from a subscriber unit 118; (2) convert the radio frequency signals into analog signals; and (3) communicate the analog signals through the distributed antenna system 100A; and (B) an intermediary device (which could be positioned within the optional distributed switching network 106) configured to: (1) receive the analog signals from the antenna unit 104; (2) convert the analog signals into digital signals; and (3) communicate the analog signals through the distributed antenna system 100A and toward the signal interface unit 102. In exemplary embodiments, the distributed antenna system 100A is an analog distributed antenna system including an antenna unit 104 configured to: (1) receive radio frequency signals from a subscriber unit 118; (2) convert the radio frequency signals into analog signals; and (3) communicate the analog signals through the distributed antenna system 100A and toward the signal interface unit 102.

In exemplary embodiments, the signal interface unit 102 is connected in the downstream to at least one of a remote radio head and an antenna rather than the distributed antenna system 100A.

In exemplary embodiments, optional distributed switching network 106 couples the plurality of signal interface units 102 with the at least one antenna unit 104. In other embodiments, the at least one antenna unit 104 is directly coupled to the at least one signal interface unit 102. Distributed switching network 106 may include one or more distributed antenna switches or other components that functionally distribute downlink signals from the at least one signal interface unit 102 to the at least one antenna unit 104. Distributed switching network 106 also functionally distributes uplink downstream signals from the at least one antenna unit 104 to the at least one signal interface unit 102. In exemplary embodiments, the distributed switching network 106 can be controlled by a separate controller or another component of the system. In exemplary embodiments, the switching elements of the distributed switching network 106 are controlled either manually or automatically. In exemplary embodiments, the routes can be pre-determined and static. In other exemplary embodiments, the routes can dynamically change based on time of day, load, or other factors.

In exemplary embodiments, the uplink downstream signal is a digital signal. In exemplary embodiments, the uplink downstream signal is an analog signal that contains at least one individual channel that is positioned within a set of spectrum that reflects its location within radio frequency spectrum when converted to a radio frequency (RF) signal. Said another way, the channel in each uplink downstream signal is at a different frequency than the other channels to which it may be aggregated in the distributed switching network 106. In exemplary embodiments, the uplink downstream signal is an analog signal through some of the distributed antenna system 100A and is converted to a digital signal at an intermediary device positioned within the distributed switching network 106.

Each antenna unit 104 is communicatively coupled to the distributed switching network 106 across a communication link 114. Specifically, antenna unit 104-1 is communicatively coupled to the distributed switching network 106 across communication link 114-1 and optional antenna unit 104-B is communicatively coupled to the distributed switching network 106 across communication link 114-B. In exemplary embodiments, some or all of the antenna units 104 receive a single downlink signal from the distributed switching network 106 or directly from a signal interface unit 102. In exemplary embodiments, some or all of the antenna units 104 include components configured to convert between at least one downlink signal received through the distributed antenna system 100A and at least one radio frequency band and at least one radio frequency antenna 116 configured to transmit and receive signals in the at least one radio frequency band to at least one subscriber unit 118. In exemplary embodiments, the downlink signal is an aggregate signal including signals from multiple upstream devices 108. In exemplary embodiments, multiple downlink radio frequency channels are supported on a single band (such as for example two W-CDMA channels on a single band).

In the downstream, each antenna unit 104 is configured to convert the at least one downlink signal into a downlink radio frequency (RF) signal in a radio frequency band. In exemplary embodiments, this may include digital to analog converters and oscillators. Each antenna unit 104 is further configured to transmit the downlink radio frequency signal in the radio frequency band to at least one subscriber unit using at least one radio frequency antenna 116. In a specific exemplary embodiment, antenna unit 104-1 is configured to convert the downlink signal received either directly from the signal interface unit 102 or through the distributed switching network 106 into a downlink radio frequency signal in a radio frequency band. Antenna unit 104-1 is further configured to transmit the downlink radio frequency signal in a radio frequency band using a radio frequency band radio frequency antenna 116-1 to at least one subscriber unit 118-1. In exemplary embodiments, the antenna unit 104-1 is configured to transmit one downlink radio frequency signal to one subscriber unit 118-1 using a radio frequency antenna 116-1 and another radio frequency signal to another subscriber unit 118-D using another radio frequency antenna 116-C. In exemplary embodiments, other combinations of radio frequency antennas 116 and other components are used to communicate other combinations of radio frequency signals in other various radio frequency bands to various subscriber units 118, such as but not limited to using multiple radio frequency antenna 116 to communicate with a single subscriber unit 118.

Similarly in the reverse path, in exemplary embodiments each antenna unit 104 is configured to receive uplink radio frequency signals from at least one subscriber unit 118 using at least one radio frequency antenna 116. Each antenna unit 104 is further configured to convert the radio frequency signals to at least one uplink downstream signal. In exemplary embodiments, at least one antenna unit 104 is further configured to aggregate the at least one uplink downstream signal with another uplink downstream signal received from another antenna unit 104 into an aggregate uplink downstream signal and further configured to communicate the at least one uplink downstream signal and/or the aggregate uplink downstream signal across at least one communication link 114 to the distributed switching network 106. In exemplary embodiments, antenna units 104 multiplex uplink downstream signals in different bands onto the same interface for communication to the next upstream element. In other exemplary embodiments (such as example embodiments implementing diversity processing), the antenna unit 104 aggregates (i.e. sums/combines) uplink downstream signals in an intelligent manner. In exemplary embodiments, multiple uplink radio frequency channels are supported on a single band (such as for example two W-CDMA channels on a single band).

In exemplary embodiments, a master reference clock is distributed between the various components of the distributed antenna system 100A to keep the various components locked to the same clock. In exemplary embodiments, a master reference clock is provided to at least one upstream device 108 via at least one signal interface unit 102 so that the upstream device 108 can lock to the master reference clock as well. In other exemplary embodiments, the master reference clock is provided from at least one upstream device 108 to the distributed antenna system 100A via at least one signal interface unit 102. In exemplary embodiments, the master reference clock is generated within a component of the distributed antenna system 100A, such as a signal interface unit 102, an antenna unit 104, or somewhere within the distributed switching network 106.

In exemplary embodiments, the communication links 112 and/or the communication links 114 are optical fibers and the communication across the communication links 112 and/or the communication links 114 is optical. In these embodiments, an electrical to optical conversion occurs at the antenna units 104 and/or at an intermediary device within the optional distributed switching network 106. In other embodiments, the communication links 112 and/or the communication links 114 are conductive cables (such as coaxial cable, twisted pair, etc.) and the communication across the communication links 112 and/or the communication links 114 is electrical. In exemplary embodiments, the communication across the communication links 112 and/or the communication links 114 is digital. In exemplary embodiments, the communication across the communication links 112 and/or the communication links 114 is analog. In exemplary embodiments, any mixture of optical, electrical, analog, and digital communication occurs across the communication links 112 and the communication links 114. In exemplary embodiments, an antenna unit 104 may include functionality to convert between digital and analog signals.

Figure 1B:
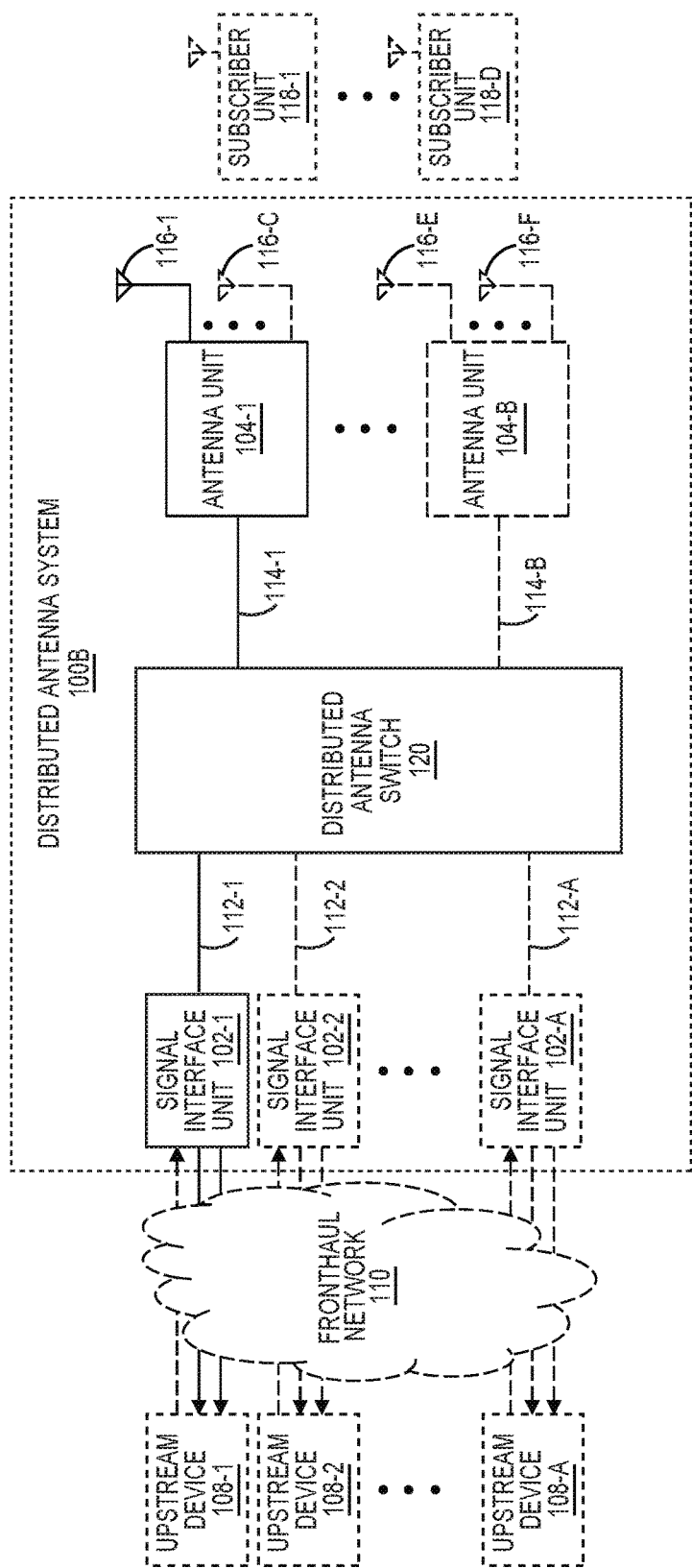

FIG. 1B is a block diagram of an exemplary embodiment of a distributed antenna system 100B. Distributed antenna system 100B includes at least one signal interface unit 102 (including signal interface unit 102-1, optional signal interface unit 102-2, and any amount of optional signal interface units 102 through optional signal interface unit 102-A), at least one antenna unit 104 (including antenna unit 104-1 and any amount of optional antenna units 104 through optional antenna unit 104-B), and a distributed antenna switch 120. Distributed antenna system 100B includes similar components to distributed antenna system 100A and operates according to similar principles and methods as distributed antenna system 100A described above. The difference between distributed antenna system 100B and distributed antenna system 100A is that distributed antenna system 100A explicitly includes the distributed antenna switch 120 (which could be a part of the optional distributed switching network 106 of distributed antenna system 100A). Each of the at least one signal interface unit 102 is communicatively coupled to the distributed antenna switch 120 across at least one communication link 112. Each antenna unit 104 is also communicatively coupled to the distributed antenna switch 120 across at least one communication link 114. In exemplary embodiments, the distributed antenna switch 120 can be controlled by a separate controller or another component of the system. In exemplary embodiments, the distributed antenna switch is controlled either manually or automatically. In exemplary embodiments, the routes can be predetermined and static. In other exemplary embodiments, the routes can dynamically change based on time of day, load, or other factors.

In the forward path, the distributed antenna switch 120 distributes and/or routes downlink signals received from the at least one signal interface unit 102 to the at least one remote antenna unit 104. In the downlink of exemplary embodiments, the distributed antenna switch 120 receives a downlink downstream signal from a signal interface unit 102 and simulcasts it to a plurality of antenna units 104. In the uplink of exemplary embodiments, the distributed antenna switch 120 receives a plurality of uplink downstream signals from a plurality of antenna units 104, digitally sums the plurality of uplink downstream signals together into an aggregate uplink downstream signal, and sends the aggregate downstream signal to a signal interface unit 102. In the uplink of other exemplary embodiments, the distributed antenna switch 120 aggregates, distributes, and/or routes, the downlink downstream signals and uplink downstream signals in other ways.

Figure 1C:
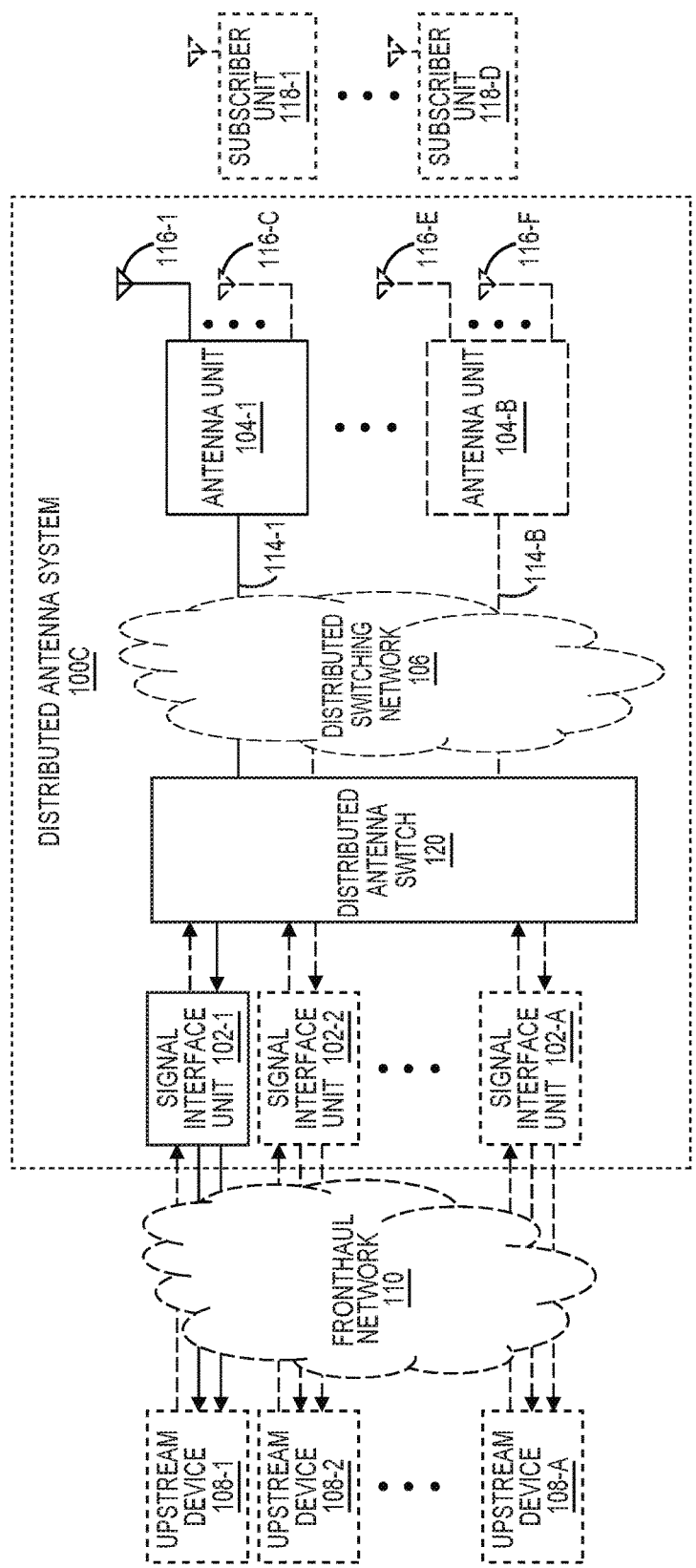

FIG. 1C is a block diagram of an exemplary embodiment of a distributed antenna system 100C. Distributed antenna system 100C includes at least one signal interface unit 102 (including signal interface unit 102-1, optional signal interface unit 102-2, and any amount of optional signal interface units 102 through optional signal interface unit 102-A), at least one antenna unit 104 (including antenna unit 104-1 and any amount of optional antenna units 104 through optional antenna unit 104-B), an optional distributed switching network 106, and a distributed antenna switch 120. Distributed antenna system 100C includes similar components to distributed antenna system 100A and distributed antenna system 100B and operates according to similar principles and methods as distributed antenna system 100A and distributed antenna system 100B described above. The difference between distributed antenna system 100C and distributed antenna system 100B is that distributed antenna system 100C includes a separate optional distributed switching network in addition to the distributed antenna switch 120. In exemplary embodiments, the optional distributed switching network 106 includes additional distributed antenna switches.

Figure 1D:
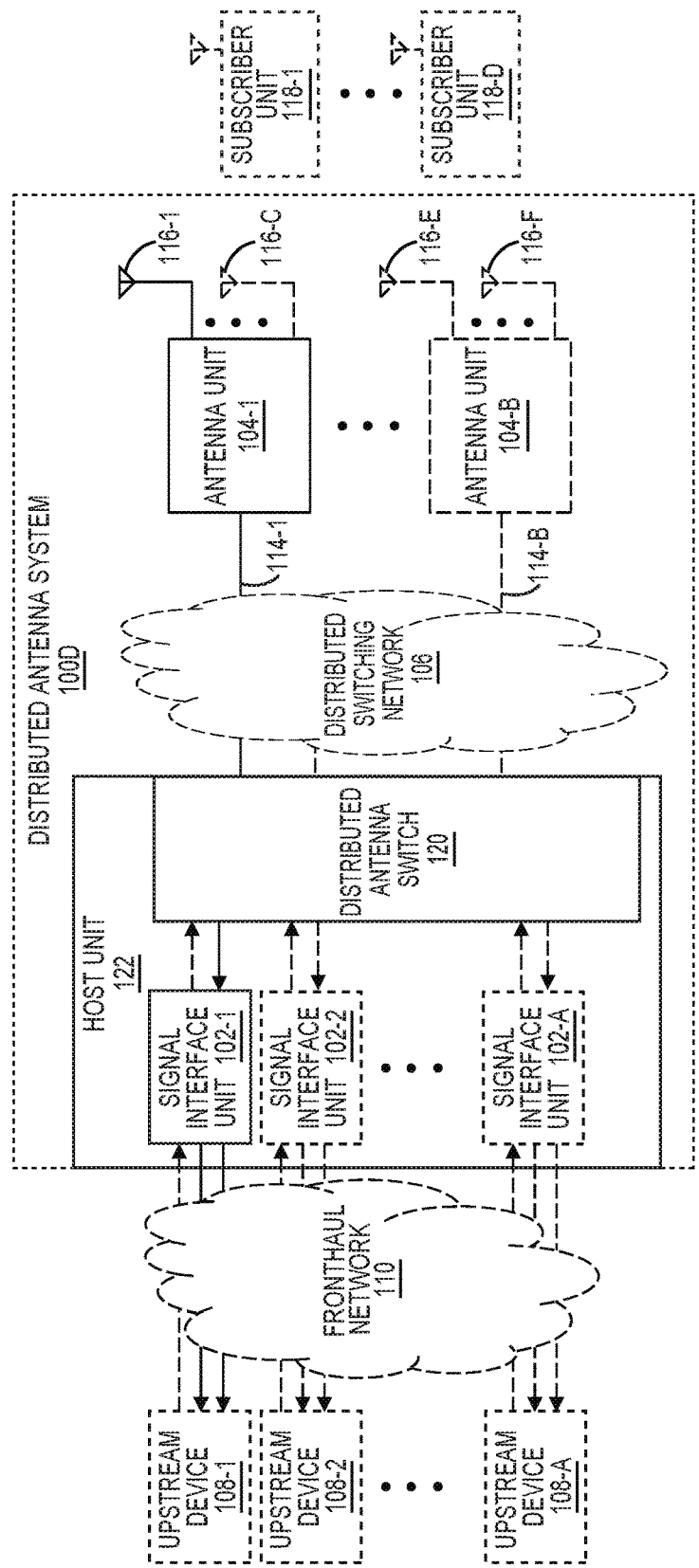

FIG. 1D is a block diagram of an exemplary embodiment of a distributed antenna system 100D. Distributed antenna system 100D includes at least one signal interface unit 102 (including signal interface unit 102-1, optional signal interface unit 102-2, and any amount of optional signal interface units 102 through optional signal interface unit 102-A), at least one antenna unit 104 (including antenna unit 104-1 and any amount of optional antenna units 104 through optional antenna unit 104-B), an optional distributed switching network 106, and a distributed antenna switch 120. Distributed antenna system 100D includes similar components to distributed antenna system 100A, distributed antenna system 100B, and distributed antenna system 100C and operates according to similar principles and methods as distributed antenna system 100A, distributed antenna system 100B, and distributed antenna system 100C described above. The difference between distributed antenna system 100D and distributed antenna system 100C is that distributed antenna system 100D includes the at least one signal interface unit 102 and the distributed antenna switch 120 within a host unit 122.

Figure 2A:
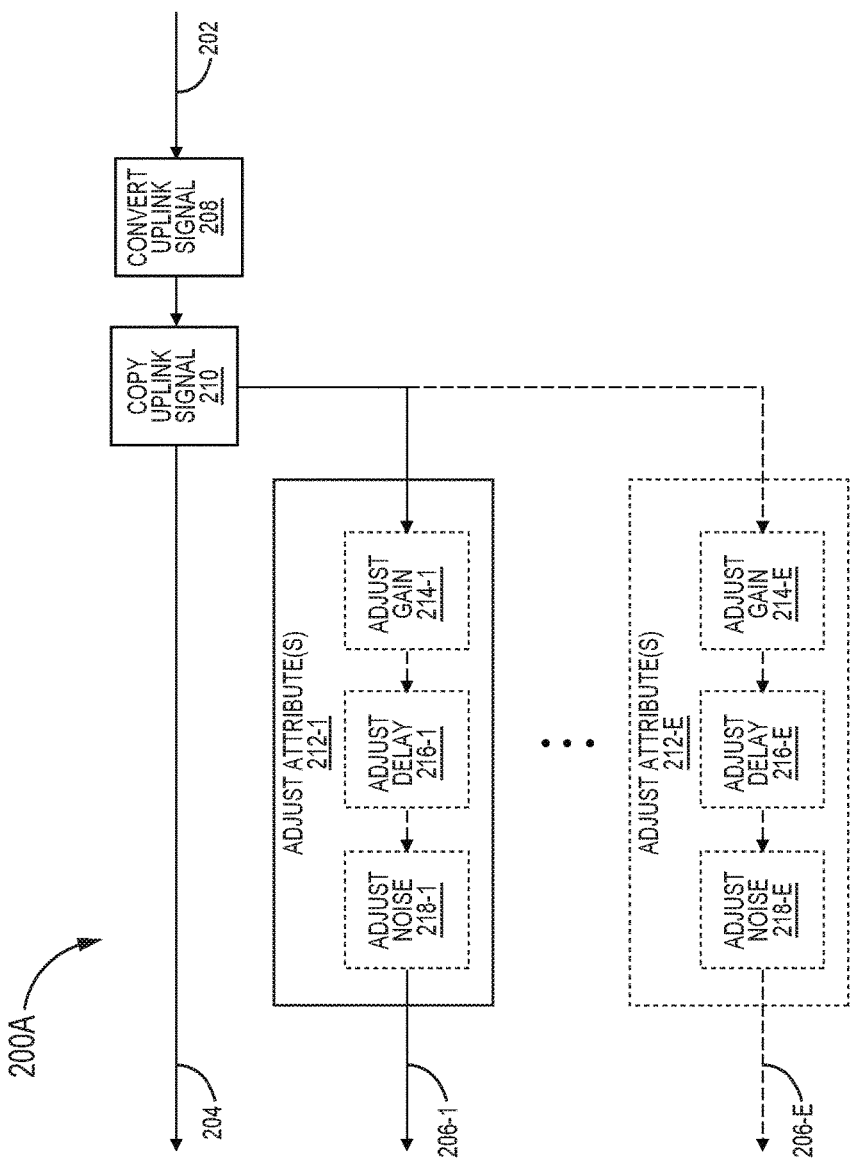
FIGS. 2A-2C are functional block diagrams of exemplary embodiments of signal paths within exemplary signal interface units used in distributed antenna systems, such as the exemplary distributed antenna systems in FIGS. 1A-1D.
Figure 2B:
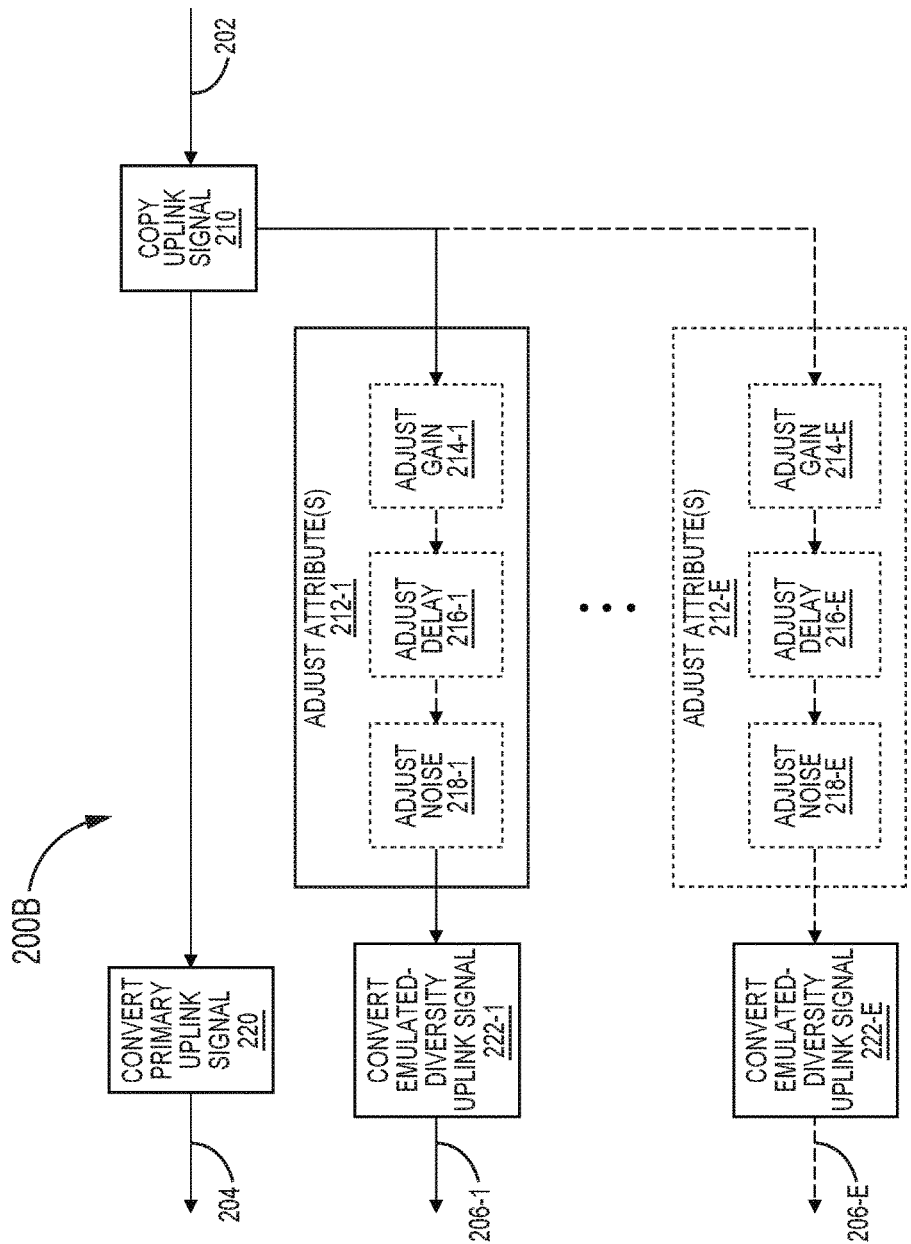
Figure 2C:
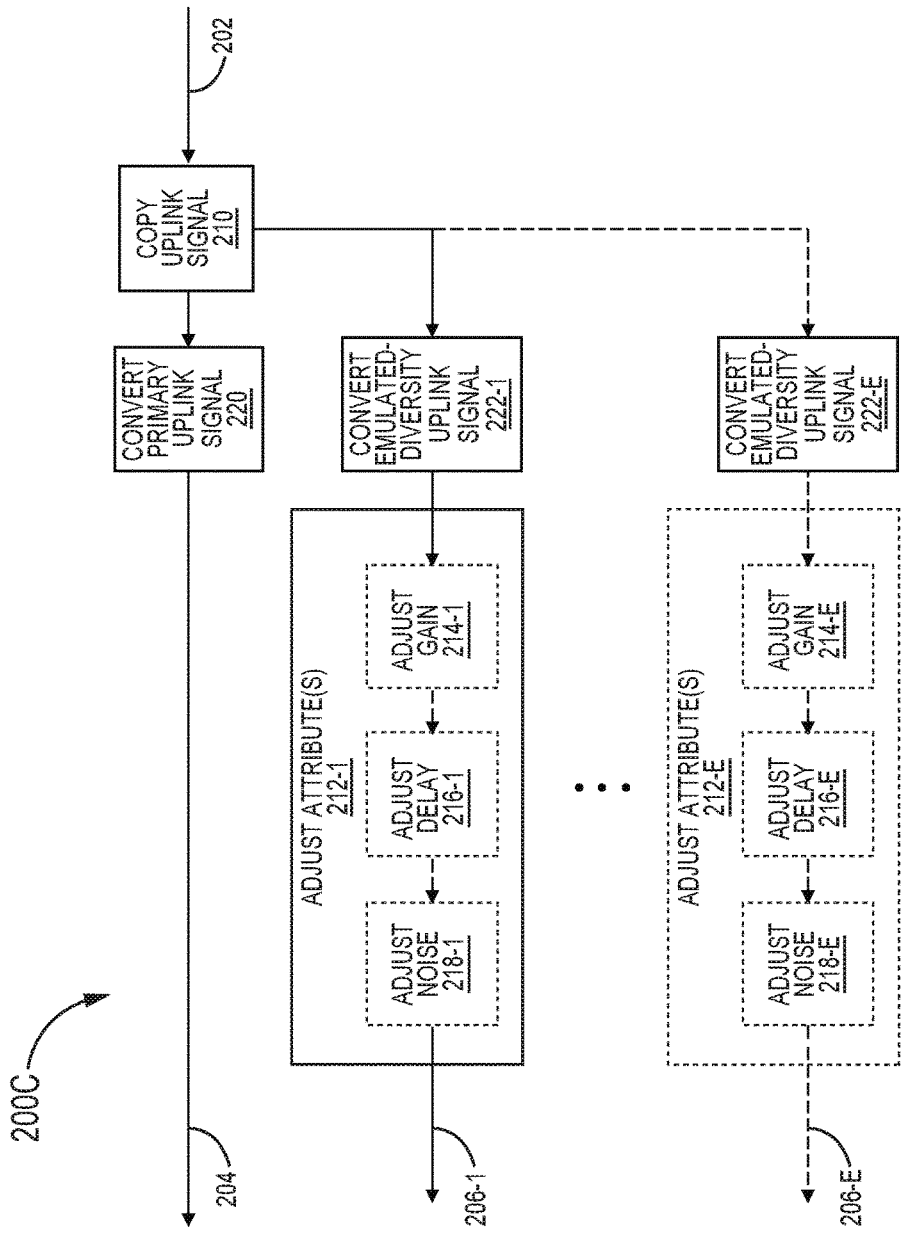

FIGS. 2A-2C are functional block diagrams of exemplary embodiments of signal paths within exemplary signal interface units 102 used in distributed antenna systems (or with remote radio heads and/or antennas directly), such as the exemplary distributed antenna systems 100A-100D described above. Each of FIGS. 2A-2C illustrates a different embodiment of a signal path, labeled 200A-200C respectively.

FIG. 2A is a functional block diagram of a signal path 200A within an exemplary signal interface unit 102. Signal path 200A includes input of an uplink downstream signal from a downstream device at input 202 and output of both a primary uplink upstream signal to an upstream device at output 204 and at least one emulated-diversity uplink upstream signal to the upstream device at output 206 (including output 206-1 and any quantity of optional outputs 206 through optional output 206-A). At block 208, the uplink downstream signal is converted between the format received from the downstream device to the format expected by the upstream device. In some embodiments, this conversion includes conversion between framing structures, conversion between analog and digital signals, conversion between intermediate and base band signals, etc. At block 210, the uplink downstream signal is copied with one copy output as the primary uplink upstream signal at output 204 and at least one copy sent to the at least one attribute adjustment block 212 (including attribute adjustment block 212-1 and any quantity of optional attribute adjustment blocks 212 through optional attributed adjustment block 212-E). At the at least one block 212, the attributes of the at least one copy of the uplink downstream signal are adjusted and the adjusted copy is output at the at least one output 206 as the at least one emulated-diversity uplink upstream signal. In exemplary embodiments, the attribute adjustments at attribute adjustment block 212 includes at least one of gain adjustment at 214, delay adjustment at 216, and noise adjustment at 218.

FIG. 2B is a functional block diagram of a signal path 200B within an exemplary signal interface unit 102. Signal path 200B includes input of an uplink downstream signal from a downstream device at input 202 and output of both a primary uplink upstream signal to an upstream device at output 204 and at least one emulated-diversity uplink upstream signal to the upstream device at output 206 (including output 206-1 and any quantity of optional outputs 206 through optional output 206-A). At block 210, the uplink downstream signal is copied with one copy output to conversion block 220 and at least one copy output to the at least one attribute adjustment block 212 (including attribute adjustment block 212-1 and any quantity of optional attribute adjustment blocks 212 through optional attribute adjustment blocks 212-E). At the at least one attribute adjustment block 212, the attributes of the at least one copy of the uplink downstream signal are adjusted and the adjusted copy is output to the at least one block 222 as at least one emulated-diversity uplink upstream signal. In exemplary embodiments, the attribute adjustments at attribute adjustment block 212 includes at least one of gain adjustment at 214, delay adjustment at 216, and noise adjustment at 218.

The primary uplink upstream signal is converted at conversion block 220 and output at output 204. At conversion block 220, the primary uplink upstream signal is converted between the format received from the downstream device to the format expected by the upstream device. In some embodiments, this conversion includes conversion between framing structures, conversion between analog and digital signals, conversion between intermediate and base band signals, etc. The at least one emulated-diversity uplink upstream signal is converted at conversion block 222 (including conversion block 222-1 and any quantity of optional conversion blocks 222 through optional conversion block 222-A) and output at output 206. At conversion block 222, the at least one emulated-diversity uplink upstream signal is converted between the format received from the downstream device to the format expected by the upstream device. In some embodiments, this conversion includes conversion between framing structures, conversion between analog and digital signals, conversion between intermediate and base band signals, etc.

FIG. 2C is a functional block diagram of a signal path 200C within an exemplary signal interface unit 102. Signal path 200C includes input of an uplink downstream signal from a downstream device at input 202 and output of both a primary uplink upstream signal to an upstream device at output 204 and at least one emulated-diversity uplink upstream signal to the upstream device at output 206 (including output 206-1 and any quantity of optional outputs 206 through optional output 206-A). At block 210, the uplink downstream signal is copied with one copy output to conversion block 220 and at least one copy output to the at least one conversion block 222 (including conversion block 222-1 and any quantity of optional conversion blocks 222 though optional conversion block 222-A). The primary uplink upstream signal is converted at conversion block 220 and output to an upstream device at output 204. At conversion block 220, the primary uplink upstream signal is converted between the format received from the downstream device to the format expected by the upstream device. In some embodiments, this conversion includes conversion between framing structures, conversion between analog and digital signals, conversion between intermediate and base band signals, etc.

The at least one emulated-diversity uplink upstream signal is converted at conversion block 222 (including conversion block 222-1 and any quantity of optional conversion blocks 222 though optional conversion block 222-A) and output to at least one attribute adjustment block 212 (including attribute adjustment block 212-1 and any quantity of optional attribute adjustment blocks 212 through optional attribute adjustment block 212-E). At conversion block 222, the at least one emulated-diversity uplink upstream signal is converted between the format received from the downstream device to the format expected by the upstream device. In some embodiments, this conversion includes conversion between framing structures, conversion between analog and digital signals, conversion between intermediate and base band signals, etc. At the at least one attribute adjustment block 212, the attributes of the at least one copy of the uplink downstream signal 210 are adjusted and the adjusted copy is output as the at least one emulated-diversity uplink signal at output 206. In exemplary embodiments, the attribute adjustments at the at least one attribute adjustment block 212 includes at least one of gain adjustment at 214, delay adjustment at 216, and noise adjustment at 218.

Figure 3A:
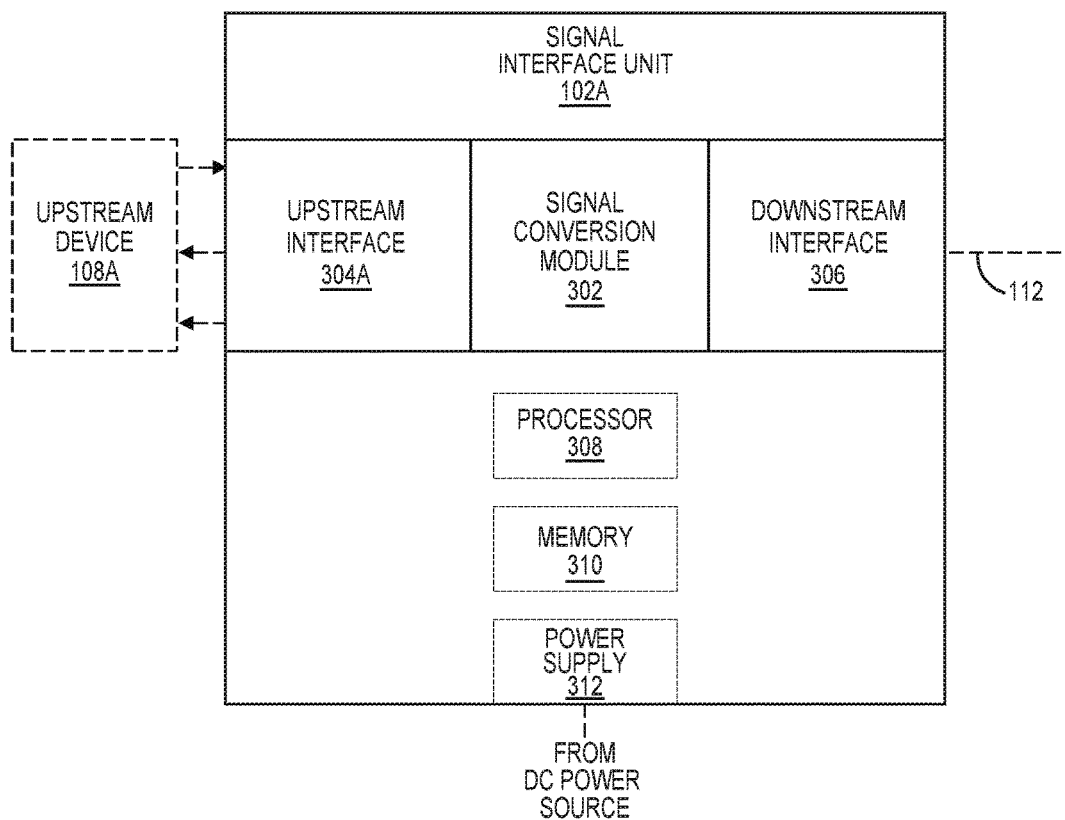
FIGS. 3A-3C are block diagrams of exemplary embodiments of signal interface units used in distributed antenna systems, such as the exemplary distributed antenna system in FIGS. 1A-1D.
Figure 3B:
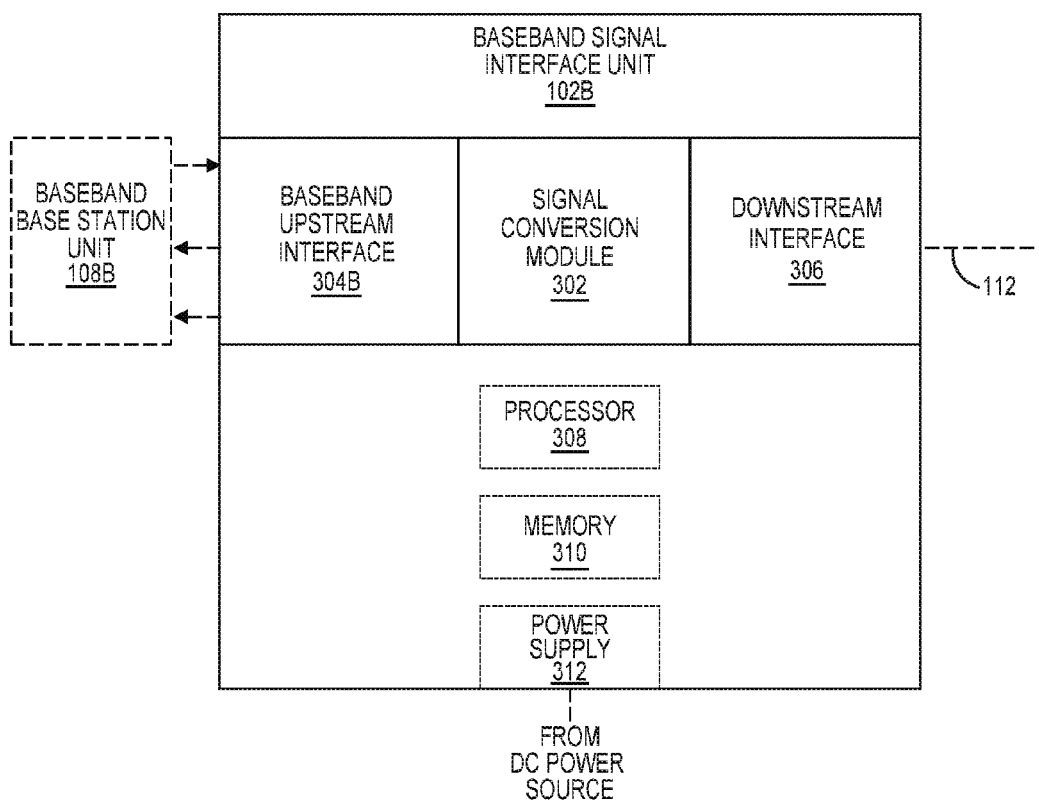
Figure 3C:
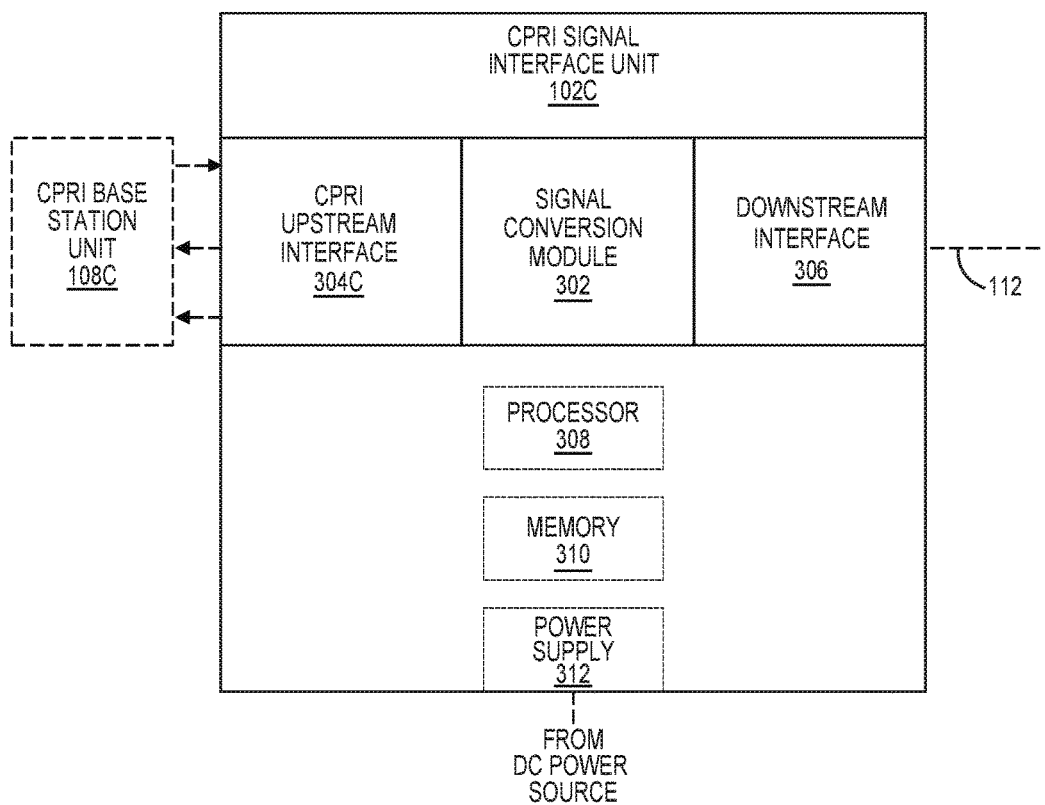

FIGS. 3A-3C are block diagrams of exemplary embodiments of signal interface units 102 used in distributed antenna systems, such as exemplary distributed antenna systems 100A-100D described above. Each of FIGS. 3A-3C illustrates a different embodiment of a type of signal interface unit 102, labeled 102A-102C respectively.

FIG. 3A is a block diagram of an exemplary embodiment of a signal interface unit 102, signal interface unit 102A. Signal interface unit 102A includes signal conversion module 302, upstream interface 304A, downstream interface 306, optional processor 308, optional memory 310, and optional power supply 312. In exemplary embodiments, signal conversion module 302 is communicatively coupled to an upstream device 108A through the at least one upstream interface 304A. Signal conversion module 302 is also communicatively coupled to at least one communication link 112 by downstream interface 306. In exemplary embodiments, the communication link 112 is an optical communication link across a fiber optic cable, though it can also be other types of wired or wireless links in other embodiments. In exemplary embodiments, the signal conversion module 302 and/or portions of the at least one upstream interface 304A and/or the downstream interface 306 are implemented using optional processor 308 and optional memory 310. In exemplary embodiments, the optional power supply 312 provides power to the various elements of the signal interface unit 102A.

In the downlink, the at least one upstream interface 304A is configured to receive downlink upstream signals from the upstream device 108A. The signal conversion module 302 is configured to convert the received downlink upstream signals to a downlink downstream signal. In exemplary embodiments, the signal conversion module 302 and/or the downstream interface 306 converts the downlink downstream signal from electrical signals to optical signals for output on communication link 112. In other embodiments, the downstream signal is transported using a conductive communication medium, such as coaxial cable or twisted pair, and the optical conversion is not necessary. The downstream interface 306 is configured to communicate the downlink downstream signal on communication link 112.

In exemplary embodiments, the downlink downstream signal is specific to a particular channel and requires additional baseband conversion before radio frequency conversion and transmission can be performed. In exemplary embodiments, the downlink downstream signal is not specific to a particular channel and does not require additional baseband conversion before radio frequency conversion and transmission can be performed. In exemplary embodiments, the downlink downstream signal contains an individual channel that is positioned within a set of spectrum that reflects its eventual location within radio frequency spectrum. In exemplary embodiments, the downstream interface is communicatively coupled with an intermediary device that aggregates the downlink downstream signal with at least one other downlink downstream signal before being transmitted to at least one antenna unit 104. In exemplary embodiments, the individual channels within the downlink downstream signal and the at least one other downlink downstream signal do not overlap and can be upconverted together simultaneously to radio frequency spectrum.

In the uplink, downstream interface 306 is configured to receive an uplink downstream signal from communication link 112. In exemplary embodiments where communication link 112 is an optical medium, the downstream interface 306 and/or the signal conversion module 302 is configured to convert the uplink downstream signal between received optical signals and electrical signals. In other embodiments, the uplink downstream signal is transported using a conductive communication medium, such as coaxial cable or twisted pair, and the optical conversion is not necessary. The signal conversion module 302 is further configured to convert the uplink downstream signal to at least one primary uplink upstream signal. Upstream interface 304A is configured to communicate the primary uplink upstream signals to the upstream device 108A.

The signal conversion module 302 is further configured to generate at least one emulated-diversity uplink upstream signal from at least one of the primary uplink upstream signal and the uplink downstream signal. In exemplary embodiments, the at least one signal interface unit 102A is configured to generate the at least one emulated-diversity uplink upstream signal by being configured to: (1) copy the primary uplink upstream signal to create the at least one emulated-diversity uplink upstream signal; and (2) adjust at least one attribute of the at least one emulated-diversity uplink upstream signal such that the at least one emulated-diversity uplink upstream signal is distinct from the primary uplink upstream signal. In exemplary embodiments, the at least one attribute includes at least one gain, delay, and noise. In exemplary embodiments, adjusting at least one attribute of the at least one emulated-diversity uplink upstream signal includes digitally adjusting the at least one attribute. In exemplary embodiments, the at least one attribute is adjusted so that the at least one emulated-diversity uplink upstream signal is different enough from the primary uplink upstream signal, so that the upstream device 108A doesn't determine that the at least one emulated-diversity uplink upstream signal is too similar to the primary uplink upstream signal. In exemplary embodiments, the upstream device 108A includes functionality to compare the primary uplink upstream signal and the at least one emulated-diversity uplink upstream signal to determine whether they meet certain criteria relative to one another that would cause them to more likely be authentic diversity signals. In exemplary embodiments, the signal interface unit 102A intentionally masks that the at least one emulated-diversity uplink upstream signal is generated by copying and adjusting the attributes of the primary uplink upstream signal to avoid the upstream device 108A to determine that the at least one emulated-diversity uplink upstream signal is not different enough from the primary uplink upstream signal.

In exemplary embodiments, the at least one signal interface unit 102A is configured to generate the at least one emulated-diversity uplink upstream signal by being configured to: (1) copy the primary uplink upstream signal to create the at least one emulated-diversity uplink upstream signal; (2) adjust gain of the at least one emulated-diversity uplink upstream signal; (3) adjust delay of the at least one emulated-diversity uplink upstream signal; and (4) adjust noise of the at least one emulated-diversity uplink upstream signal. In other exemplary embodiments, the at least one signal interface unit 102A is configured to generate at least one emulated-diversity uplink upstream signal by being configured to: (1) copy the uplink downstream signal into a duplicate uplink downstream signal; (2) adjust at least one attribute of the duplicate uplink downstream signal; and (3) convert the duplicate uplink downstream signal into the at least one emulated-diversity uplink upstream signal. In exemplary embodiments, the copying, adjusting, and/or converting steps are combined together and/or in other orders. In other embodiments, the at least one emulated-diversity uplink upstream signal is generated in other ways.

In exemplary embodiments, each of the plurality of emulated-diversity uplink upstream signals is generated such that all of the plurality of emulated-diversity uplink upstream signals are distinct from each other and the primary uplink upstream signal. In exemplary embodiments, the at least one signal interface unit 102A is configured to convert the uplink downstream signal into the primary uplink upstream signal by converting between two distinct framing structures. In exemplary embodiments, at least one of the uplink downstream signal and the primary uplink upstream signal includes I/Q pairs. In exemplary embodiments, the at least one signal interface unit 102A is configured to convert the uplink downstream signal into the primary uplink upstream signal by converting from a first baseband representation to a second baseband representation. In exemplary embodiments, the at least one signal interface unit 102A is configured to convert the uplink downstream signal into the primary uplink upstream signal by converting from an analog signal into a digital signal.

In exemplary embodiments, the upstream device 108A is a base station configured to receive the primary uplink upstream signal and the at least one emulated-diversity uplink upstream signal. In exemplary embodiments, the primary uplink upstream signal and the at least one emulated-diversity uplink upstream signal are formatted according to at least one of a Common Public Radio Interface (CPRI) standard, an Open Base Station Architecture Initiative (OBSAI) standard, and an Open Radio Interface (ORI) standard. In exemplary embodiments, the base station includes a dual diversity demodulator. In exemplary embodiments, the upstream device 108A is one of a Common Public Radio Interface (CPRI) device interface, an Open Base Station Architecture Initiative (OBSAI) device interface, and an Open Radio Interface (ORI) device interface.

In exemplary embodiments, at least one alarm is triggered by the upstream device 108A if the primary uplink upstream signal is either too similar or too dissimilar from the at least one emulated-diversity uplink upstream signal. In exemplary embodiments, at least one alarm is triggered by the upstream device 108A if at least a second attribute of the primary uplink upstream signal differs from the at least one attribute of the at least one emulated-diversity uplink upstream signal by more than a first threshold. In exemplary embodiments, at least one alarm is triggered by the upstream device 108A if at least a second attribute of the primary uplink differs from the at least one attribute of the at least one emulated-diversity uplink upstream signal by less than a second threshold. In exemplary embodiments, at least one alarm is triggered by the upstream device 108A if at least a second attribute of the primary uplink differs from the at least one attribute of the at least one emulated-diversity uplink upstream signal by less than a first threshold.

In exemplary embodiments, the downstream interface 306 receives uplink downstream signals corresponding to multiple radio frequency channels on a single given band (such as two or more W-CDMA channels) and converts signals for each of the multiple radio frequency channels separately into the uplink upstream signals each with at least one emulated-diversity uplink baseband signal.

In exemplary embodiments, an optional signal interface unit clock unit is communicatively coupled to an upstream device clock unit of the upstream device 108A. In exemplary embodiments, a master reference clock is provided to the upstream device clock unit of the upstream device 108A from the signal interface unit clock unit of the signal interface unit 102A. In other exemplary embodiments, a master reference clock is provided from the upstream device clock unit of the upstream device 108A to the signal interface unit clock unit of the signal interface unit 102A. In other exemplary embodiments, a network interface clock unit is not coupled directly to an upstream device clock unit of the upstream device 108A to provide the master reference clock to the upstream device 108A. Instead, a signal interface unit clock unit provides the master reference clock to the signal conversion module 302 and the master reference clock is embedded in an upstream signal from the signal conversion module 302 to the upstream device 108A. In particular, uplink downstream signals can be clocked using the master clock, such that the master clock is embedded in the uplink downstream signals. Then, an upstream device clock unit extracts the master clock from uplink downstream signals and distributes the master clock as appropriate in the upstream device 108A to establish a common clock with the distributed antenna system 100 in the upstream device 108A. In exemplary embodiments where the master reference clock is provided from an upstream device 108A to the distributed antenna system 100, the master reference clock can be embedded in the downlink upstream signals by an upstream device clock unit so that the downlink upstream signals communicated from the upstream device 108A to the signal conversion module 302 can be extracted by a signal interface unit clock unit and distributed as appropriate within the signal interface unit 102A and the distributed antenna system 100 generally.

FIG. 3B is a block diagram of an exemplary embodiment of a type of signal interface unit 102, baseband signal interface unit 102B. Baseband signal interface unit 102B includes the signal conversion module 302, a baseband upstream interface 304B, the downstream interface 306, the optional processor 308, the optional memory 310, and the optional power supply 312. Baseband signal interface unit 102B includes similar components to signal interface unit 102A and operates according to similar principles and methods as signal interface unit 102A. The difference between baseband signal interface unit 102B and signal interface unit 102A is that the baseband signal interface unit 102C is a more specific embodiment that interfaces with a baseband base station 108B using a baseband upstream interface 304B. Further, the baseband signal interface unit 102B includes a signal conversion module 302 that converts between baseband signals and the downstream signals used for transport in the distributed antenna system 100 network. In exemplary embodiments, the signal conversion module 302 converts the uplink downstream signal received from the downstream interface 306 into a primary uplink baseband signal and generates at least one emulated-diversity uplink baseband signal from at least one of the primary uplink baseband signal and the uplink downstream signal according to the description of the signal interface unit 102A above. In exemplary embodiments, the primary uplink baseband signal and the at least one emulated-diversity uplink baseband signal are communicated to a dual diversity demodulator of the baseband base station unit 108B, which compares the primary uplink baseband signal with the at least one emulated-diversity uplink baseband signals to determine whether they are distinct enough to come from two or more antennas (such as a primary antenna and at least one diversity antenna).

FIG. 3C is a block diagram of an exemplary embodiment of a type of signal interface unit 102, Common Public Radio Interface (CPRI) signal interface unit 102C. CPRI signal interface unit 102C includes the signal conversion module 302, a CPRI upstream interface 304C, the downstream interface 306, the optional processor 308, the optional memory 310, and the optional power supply 312. CPRI signal interface unit 102C includes similar components to signal interface unit 102A and operates according to similar principles and methods as signal interface unit 102A. The difference between CPRI signal interface unit 102C and signal interface unit 102A is that the CPRI signal interface unit 102C is a more specific embodiment that interfaces with a CPRI base station 108C using a CPRI upstream interface 304C. Further, the CPRI signal interface unit 102C includes a signal conversion module 302 that converts between CPRI signals and the downstream signal used for transport in the distributed antenna system 100 network. In exemplary embodiments, the signal conversion module 302 converts the uplink downstream signal received from the downstream interface 306 into a primary uplink CPRI signal and generates at least one emulated-diversity uplink CPRI signal from at least one of the primary uplink CPRI signal and the uplink downstream signal according to the description of the signal interface unit 102A above.

Figure 4:
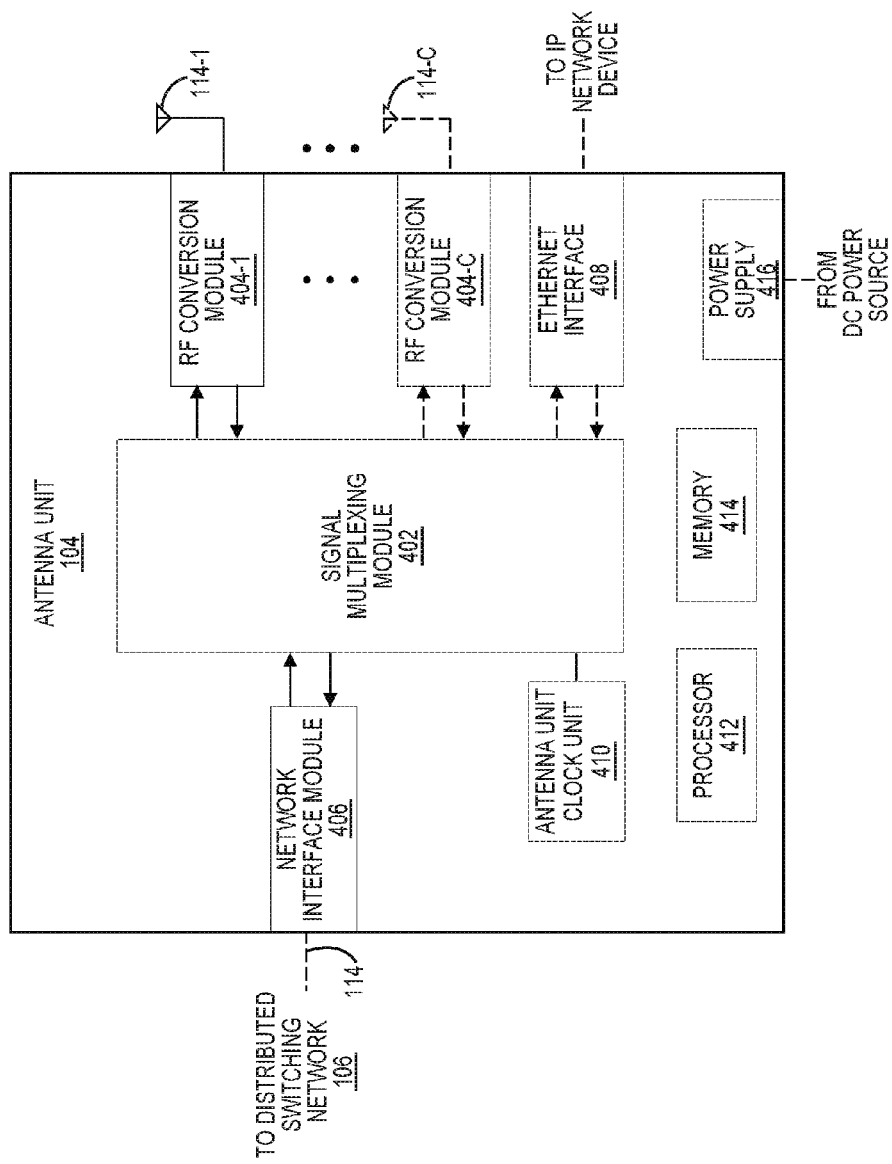
FIG. 4 is a block diagram of an exemplary embodiment of an antenna unit used in distributed antenna systems, such as the exemplary distributed antenna systems in FIGS. 1A-1D.

FIG. 4 is a block diagram of an exemplary embodiment of an antenna unit 104 used in distributed antenna systems, such as exemplary distributed antenna system 100 described above. The antenna unit 104 includes an optional signal multiplexing module 402, at least one radio frequency (RF) conversion module 404 (including RF conversion module 404-1 and any amount of optional RF conversion modules 404 through optional RF conversion module 404-C), network interface module 406, optional Ethernet interface 408, optional antenna unit clock unit 410, optional processor 412, optional memory 414, and optional power supply 416. In exemplary embodiments, optional signal multiplexing module 402, at least one RF conversion module 404, and/or the network interface module 406 are implemented at least in part by optional processor 412 and optional memory 414. In exemplary embodiments, optional power supply 416 is used to power the various components of the antenna unit 104.

In exemplary embodiments, optional signal multiplexing module 402 receives at least one downlink downstream signal from at least one signal interface unit 102 through the distributed switching network 106. In exemplary embodiments, the at least one downlink downstream signal is received through the network interface module 406. In exemplary embodiments where the downlink downstream signal is an optical signal, the network interface module 406 converts the downlink downstream signal from an optical format to an electrical format. In exemplary embodiments, more input lines and/or more network interface module 406 are included in the antenna unit 104. In exemplary embodiments, the optional signal multiplexing module 402 splits apart an aggregate downlink downstream signal into at least one downlink downstream signal that is sent to RF conversion module 404-1 for eventual transmission as a radio frequency on radio frequency antenna 116-1. In exemplary embodiments, the optional signal multiplexing module 402 splits apart the aggregate downlink downstream signal into a plurality of downlink downstream signals that are sent to a plurality of RF conversion modules 404 for eventual transmission as radio frequency signals at radio frequency antennas 116.

In exemplary embodiments, optional signal multiplexing module 402 receives at least one uplink downstream signal from at least one RF conversion module 404. In exemplary embodiments, the optional signal multiplexing module 402 receives a plurality of uplink downstream signals from a plurality of RF conversion modules 404. In exemplary embodiments, the optional signal multiplexing unit aggregates at least one uplink downstream signal received from an RF conversion module 404-1 with another uplink downstream signal received from another RF conversion module 404. In exemplary embodiments, the optional signal multiplexing module 402 aggregates a plurality of uplink downstream signals into a single aggregate uplink downstream signal. In exemplary embodiments, the aggregate uplink downstream signal is provided to network interface module 406 which converts the aggregate uplink downstream signal from electrical signals to optical signals before communicating the aggregate uplink downstream signal to the distributed switching network 106 through the distributed switching network 106. In other embodiments, the aggregate uplink downstream signal is communicated as electrical signals toward the distributed switching network 106. In exemplary embodiments, the aggregate uplink downstream signal is converted to optical signals at another place in the distributed antenna system 100.

In exemplary embodiments without optional signal multiplexing module 402, the network interface module 406 receives an uplink downstream signal from the RF conversion module 404-1 which converts the uplink downstream signal from electrical signals to optical signals before communicating the uplink downstream signal to the distributed switching network 106 through the distributed switching network 106. In other embodiments, the uplink downstream signal is communicated as electrical signals toward the distributed switching network 106. In exemplary embodiments, the uplink downstream signal is converted to optical signals at another place in the distributed antenna system.

In exemplary embodiments, the optional Ethernet interface 408 receives a downlink downstream signal from the optional signal multiplexing module 402 and converts it to Ethernet packets and communicates the Ethernet packets with an internet protocol network device. The optional Ethernet interface 408 also receives Ethernet packets from the internet protocol network device and converts them to an uplink downstream signal and communicates it to the optional signal multiplexing module 402. In exemplary embodiments having the optional Ethernet interface 408, a corresponding upstream device 108 that is an Ethernet interface interfaces with a signal interface unit 102 that is an Ethernet interface.

In exemplary embodiments, the optional antenna unit clock unit 410 extracts the master reference clock from the downlink downstream signal and uses this master clock within the antenna unit 104 to establish a common time base in the antenna unit 104 with the rest of the distributed antenna system 100. In exemplary embodiments, the optional antenna unit clock unit 410 generates a master reference clock and distributes the generated master reference clock to other components of the distributed antenna system 100 (and even the upstream devices 108) in the upstream using the uplink downstream signal.

Figure 5A:
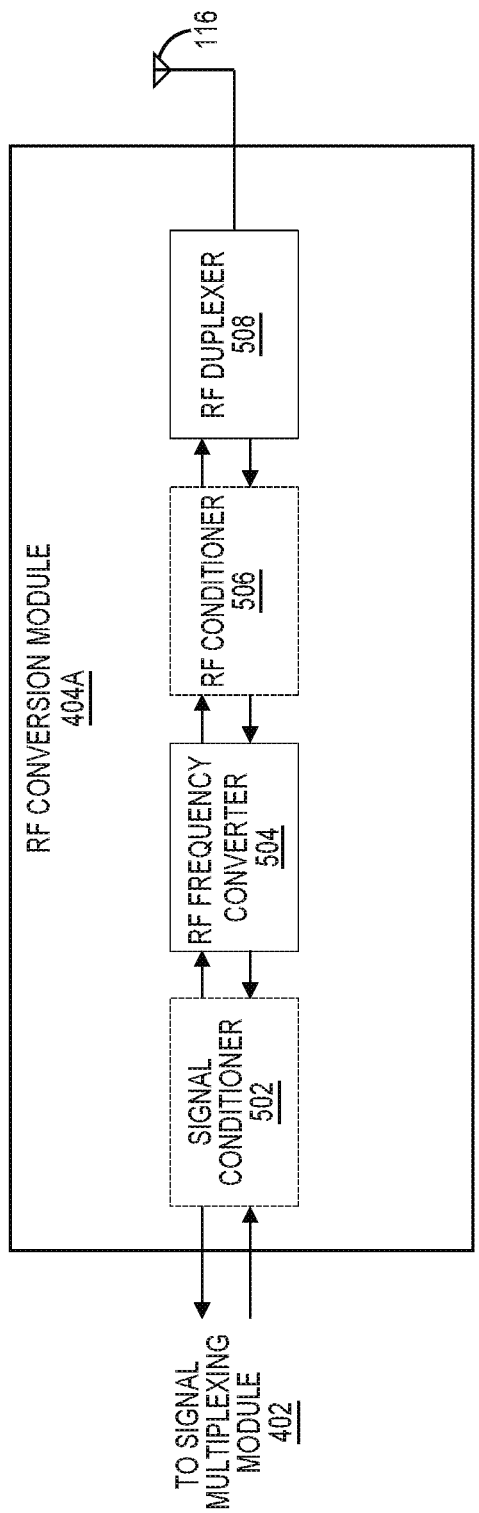
FIGS. 5A-5C are block diagrams of exemplary embodiments of RF conversion modules used in antenna units of distributed antenna systems, such as the exemplary antenna unit in FIG. 4.
Figure 5B:
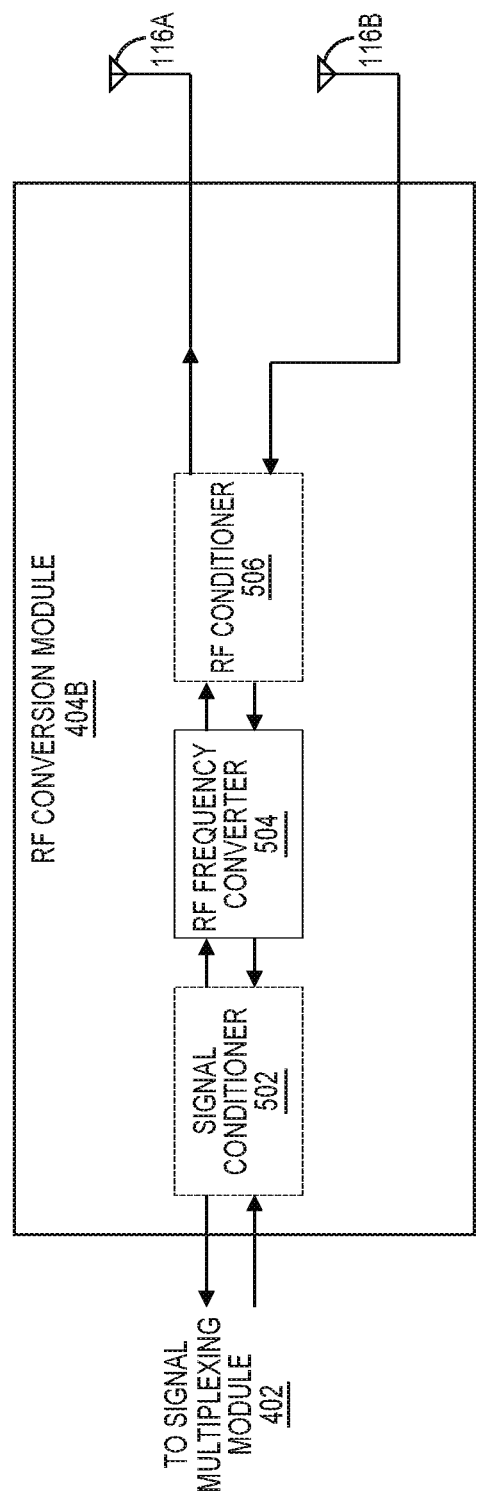
Figure 5C:
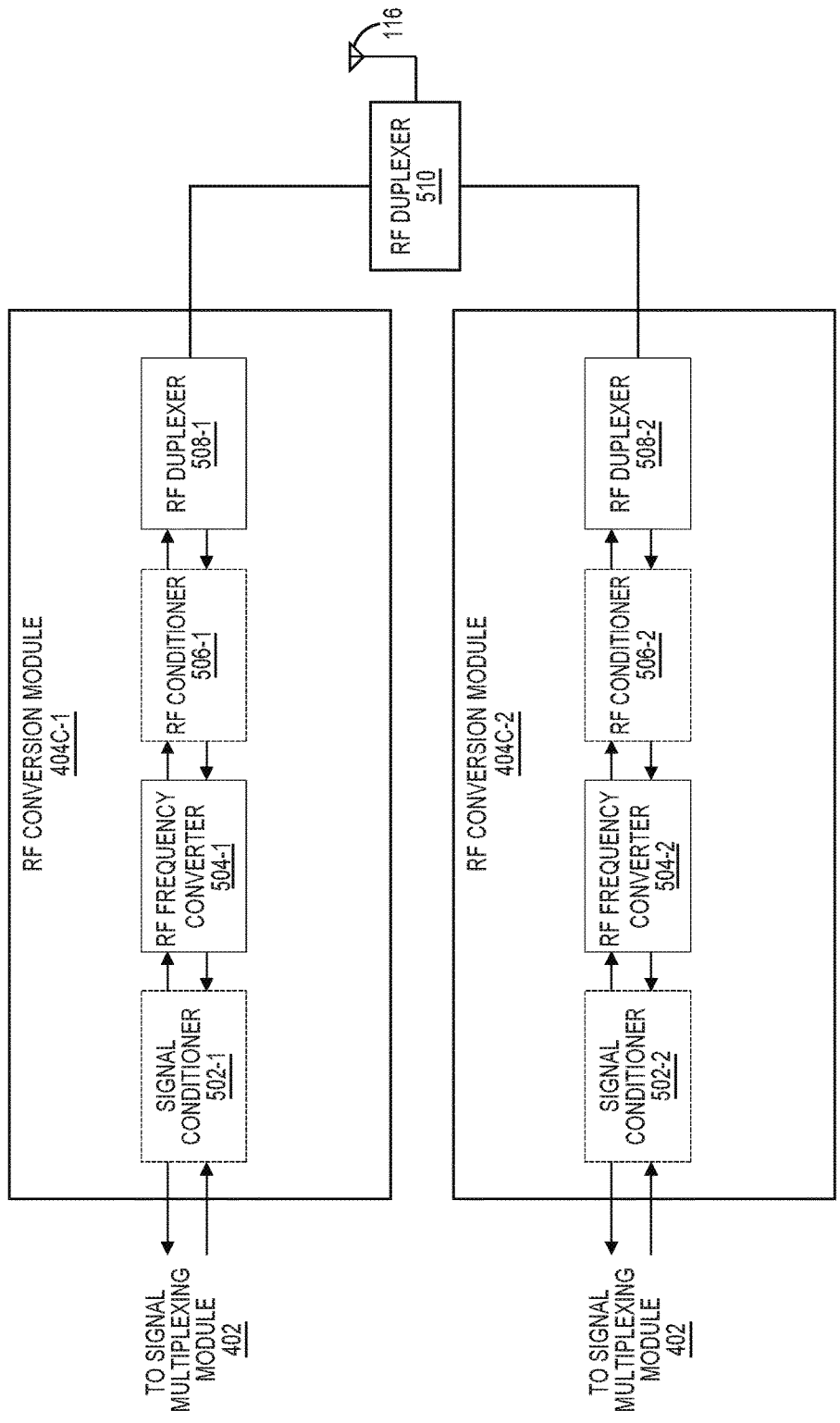

FIGS. 5A-5C are block diagrams of exemplary embodiments of RF conversion modules 404 used in antenna units of distributed antenna systems, such as the exemplary antenna unit 104 described above. Each of FIGS. 5A-5C are block diagrams of exemplary embodiments of RF conversion module 404, labeled RF conversion module 404A-404C respectively.

FIG. 5A is a block diagram of an exemplary RF conversion module 404A including an optional downstream signal conditioner 502, a radio frequency (RF) converter 504, an optional RF conditioner 506, and an RF duplexer 508 coupled to a single radio frequency antenna 116.

The optional downstream signal conditioner 502 is communicatively coupled to an optional signal multiplexing module 402 and the RF converter 504. In the forward path, the optional downstream signal conditioner 502 conditions the downlink upstream signal (for example, through amplification, attenuation, and filtering) received from the optional signal multiplexing module 402 and passes the downlink upstream signal to the RF converter 504. In the reverse path, the optional downstream signal conditioner 502 conditions the uplink downstream signal (for example, through amplification, attenuation, and filtering) received from the RF converter 504 and passes the uplink downstream signal to the optional signal multiplexing module 402.

The RF converter 504 is communicatively coupled to either the optional signal multiplexing module 402 or the optional downstream signal conditioner 502 on one side and to either RF duplexer 508 or the optional RF conditioner 506 on the other side. In the downstream, the RF converter 504 converts a downlink upstream signal to downlink radio frequency (RF) signals and passes the downlink RF signals onto either the RF duplexer 508 or the optional RF conditioner 506. In the upstream, the RF converter 504 converts uplink radio frequency (RF) signals received from either the RF duplexer 508 or the optional RF conditioner 506 to an uplink downstream signal and passes the uplink downstream signal to either the optional signal multiplexing module 402 or the optional downstream signal conditioner 502.

The RF duplexer 508 is communicatively coupled to either the RF converter 504 or the optional RF conditioner 506 on one side and the radio frequency antenna 116 on the other side. The RF duplexer 508 duplexes the downlink RF signals with the uplink RF signals for transmission/reception using the radio frequency antenna 116. In exemplary embodiments, the downlink and uplink downstream signals within a radio frequency band are distinct in spectrum and are separated in a frequency using a Frequency Division Duplexing (FDD) scheme. In other embodiments, either or both of the downlink and uplink downstream signals within the radio frequency band are separated in time using a Time Division Duplexing (TDD) scheme. In exemplary embodiments, downlink and uplink downstream signals within a radio frequency band overlap in spectrum and are separated in time using a Time Division Duplexing (TDD) scheme.

FIG. 5B is a block diagram of an exemplary RF conversion module 404B including an optional downstream signal conditioner 502, an RF converter 504, and an optional RF conditioner 506 coupled to a downlink radio frequency antenna 116A and an uplink radio frequency antenna 116B. RF conversion module 404B includes similar components to RF conversion module 404A and operates according to similar principles and methods as RF conversion module 404A described above. The difference between RF conversion module 404B and RF conversion module 404A is that RF conversion module 404B does not include RF duplexer 508 and instead includes separate downlink radio frequency antenna 116A used to transmit RF signals to at least one subscriber unit and uplink radio frequency antenna 116B used to receive RF signals from at least one subscriber unit.

FIG. 5C is a block diagram of an exemplary RF conversion module 404C-1 and exemplary RF conversion module 404C-2 that share a single radio frequency antenna 116 through an RF diplexer 510. The RF conversion module 404C-1 includes an optional downstream signal conditioner 502-1, an RF converter 504-1, an optional RF conditioner 506-1, and an RF duplexer 508-1 communicatively coupled to RF diplexer 510 that is communicatively coupled to radio frequency antenna 116. Similarly, the RF conversion module 404C-2 includes an optional downstream signal conditioner 502-2, an RF converter 504-2, an optional RF conditioner 506-2, and an RF duplexer 508-2 communicatively coupled to RF diplexer 510 that is communicatively coupled to radio frequency antenna 116. Each of RF conversion module 404C-1 and 404C-2 operate according to similar principles and methods as RF conversion module 404A described above. The difference between RF conversion modules 404C-1 and 404C-2 and RF conversion module 404A is that RF conversion modules 404C-1 and 404C-2 are both coupled to a single radio frequency antenna 116 through RF diplexer 510. The RF diplexer 510 diplexes the duplexed downlink and uplink downstream signals for both RF conversion module 404C-1 and 404C-2 for transmission/reception using the single radio frequency antenna 116.

Figure 6:
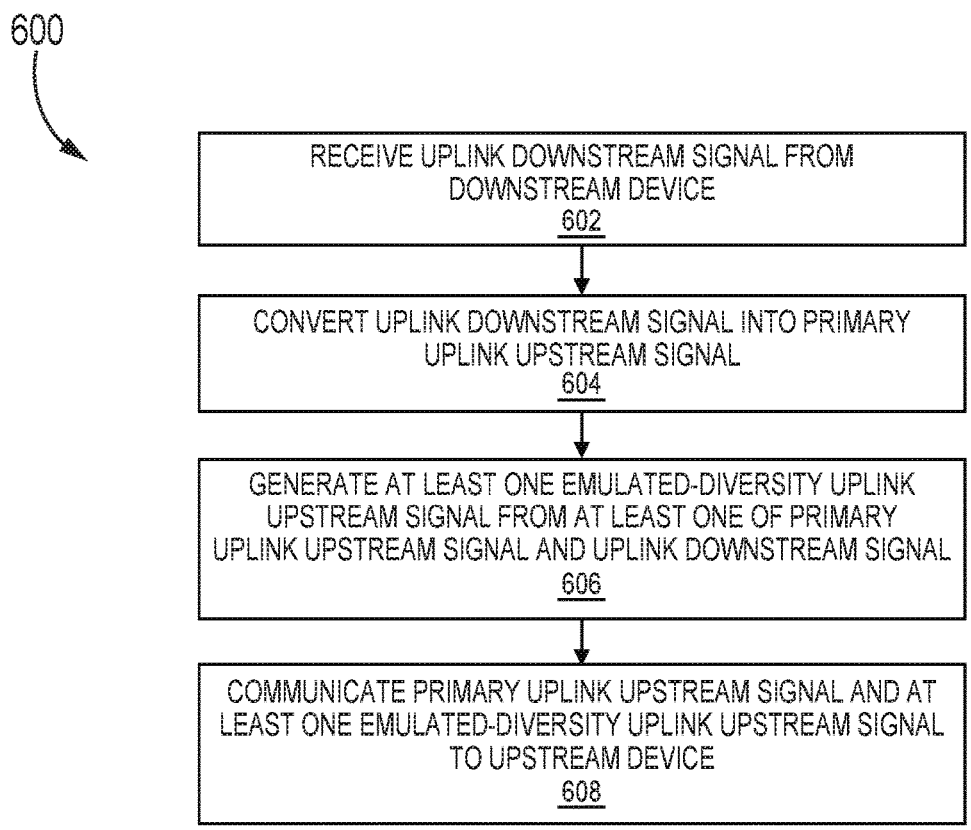
FIG. 6 is a flow diagram illustrating one exemplary embodiment of a method for emulating uplink diversity signals.

FIG. 6 is a flow diagram illustrating one exemplary embodiment of a method 600 for emulating uplink diversity signals. Exemplary method 600 begins at block 602 with receiving an uplink downstream signal from a downstream device. Exemplary method 600 proceeds to block 604 with converting the uplink downstream signal into a primary uplink upstream signal. In exemplary embodiments, the uplink downstream signal is in a first format used by the downstream device while the primary uplink upstream signal is in a second format used by an upstream device. In exemplary embodiments, the first format and the second format are different in their framing structures, whether they are analog and/or digital signals, and/or whether they are intermediate frequency, radio frequency, and/or base band frequency signals. In some embodiments, this conversion includes conversion between framing structures, conversion between analog and digital signals, conversion between intermediate and base band signals, etc.

Exemplary method 600 proceeds to block 606 with generating at least one emulated-diversity uplink upstream signal from at least one of the primary uplink upstream signal and the uplink downstream signal. In exemplary embodiments, generating the at least one emulated-diversity uplink upstream signal from at least one of the primary uplink upstream signal and the uplink downstream signal includes: (1) copying the primary uplink upstream signal to create the at least one emulated-diversity uplink upstream signal; and (2) adjusting at least one attribute of the at least one emulated-diversity uplink upstream signal such that the at least one emulated-diversity uplink upstream signal is distinct from the primary uplink upstream signal. In exemplary embodiments, the at least one attribute includes at least one gain, delay, and noise. In exemplary embodiments, adjusting at least one attribute of the at least one emulated-diversity uplink upstream signal includes digitally adjusting the at least one attribute.

In exemplary embodiments, generating the at least one emulated-diversity uplink upstream signal from at least one of the primary uplink upstream signal and the uplink downstream signal includes: (1) copying the primary uplink upstream signal to create the at least one emulated-diversity uplink upstream signal; (2) adjusting gain of the at least one emulated-diversity uplink upstream signal; (3) adjusting delay of the at least one emulated-diversity uplink upstream signal; and (4) adjusting noise of the at least one emulated-diversity uplink upstream signal. In exemplary embodiments, generating the at least one emulated-diversity uplink upstream signal from at least one of the primary uplink upstream signal and the uplink downstream signal includes: (1) copying the uplink downstream signal into a duplicate uplink downstream signal; (2) adjusting at least one attribute of the duplicate uplink downstream signal; and (3) converting the duplicate uplink downstream signal into the at least one emulated-diversity uplink upstream signal.

In exemplary embodiments, the at least one emulated-diversity uplink upstream signal includes a plurality of emulated-diversity uplink upstream signals. Exemplary embodiments further comprise generating each of the plurality of emulated-diversity uplink upstream signals such that all of the plurality of emulated-diversity uplink upstream signals are distinct from each other and the primary uplink upstream signal. In exemplary embodiments, converting the uplink downstream signal into the primary uplink upstream signal includes converting between two distinct framing structures. In exemplary embodiments, at least one of the uplink downstream signal and the primary uplink upstream signal includes I/Q pairs.

In exemplary embodiments, converting the uplink downstream signal into the primary uplink upstream signal includes converting from a first baseband representation to a second baseband representation. In exemplary embodiments, converting the uplink downstream signal into the primary uplink upstream signal includes converting from an analog signal into a digital signal. In exemplary embodiments, the upstream device is a base station configured to receive the primary uplink upstream signal and the at least one emulated-diversity uplink upstream signal.

Exemplary method 600 proceeds to block 608 with communicating the primary uplink upstream signal and the at least one emulated-diversity uplink upstream signal to an upstream device. In exemplary embodiments, the primary uplink upstream signal and the at least one emulated-diversity uplink upstream signal are formatted according to at least one of a Common Public Radio Interface (CPRI) standard, an Open Base Station Architecture Initiative (OB-SAI) standard, and an Open Radio Interface (ORI) standard.

Exemplary embodiments further comprise triggering at least one alarm if the primary uplink upstream signal is either too similar or too dissimilar from the at least one emulated-diversity uplink upstream signal. Exemplary embodiments further comprise triggering at least one alarm if at least a second attribute of the primary uplink upstream signal differs from the at least one attribute of the at least one emulated-diversity uplink upstream signal by more than a first threshold. Exemplary embodiments further comprise triggering at least one alarm if at least a second attribute of the primary uplink upstream signal differs from the at least one attribute of the at least one emulated-diversity uplink upstream signal by less than a second threshold. Exemplary embodiments further comprise triggering at least one alarm if at least a second attribute of the primary uplink upstream signal differs from the at least one attribute of the at least one emulated-diversity uplink upstream signal by less than a first threshold.

In exemplary embodiments, the downstream device includes at least one of a component of a distributed antenna system, a remote radio head, and an antenna.

Any of the processors described above may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a signal interface unit for interfacing uplink downstream signals from a downstream device with an upstream device, the signal interface unit comprising: at least one upstream interface configured to communicate a primary uplink upstream signal and at least one emulated-diversity uplink upstream signal to an upstream device; a downstream interface configured to receive an uplink downstream signal from a downstream device; wherein the signal interface unit is configured to convert the uplink downstream signal into the primary uplink upstream signal; wherein the signal interface unit is further configured to generate the at least one emulated-diversity uplink upstream signal from at least one of the primary uplink upstream signal and the uplink downstream signal.

Example 2 includes the signal interface unit of Example 1, wherein the signal interface unit is configured to generate the at least one emulated-diversity uplink upstream signal by being configured to: copy the primary uplink upstream signal to create the at least one emulated-diversity uplink upstream signal; and adjust at least one attribute of the at least one emulated-diversity uplink upstream signal such that the at least one emulated-diversity uplink upstream signal is distinct from the primary uplink upstream signal.

Example 3 includes the signal interface unit of Example 2, wherein the at least one attribute includes at least one gain, delay, and noise.

Example 4 includes the signal interface unit of any of Examples 2-3, wherein adjusting at least one attribute of the at least one emulated-diversity uplink upstream signal includes digitally adjusting the at least one attribute.

Example 5 includes the signal interface unit of any of Examples 1-4, wherein the signal interface unit is configured to generate the at least one emulated-diversity uplink upstream signal by being configured to: copy the primary uplink upstream signal to create the at least one emulated-diversity uplink upstream signal; adjust gain of the at least one emulated-diversity uplink upstream signal; adjust delay of the at least one emulated-diversity uplink upstream signal; and adjust noise of the at least one emulated-diversity uplink upstream signal.

Example 6 includes the signal interface unit of any of Examples 1-5, wherein the signal interface unit is configured to generate at least one emulated-diversity uplink upstream signal by being configured to: copy the uplink downstream signal into a duplicate uplink downstream signal; adjust at least one attribute of the duplicate uplink downstream signal; and convert the duplicate uplink downstream signal into the at least one emulated-diversity uplink upstream signal.

Example 7 includes the signal interface unit of any of Examples 1-6, wherein the at least one emulated-diversity uplink upstream signal includes a plurality of emulated-diversity uplink upstream signals.

Example 8 includes the signal interface unit of Example 7, wherein each of the plurality of emulated-diversity uplink upstream signals is generated such that all of the plurality of emulated-diversity uplink upstream signals are distinct from each other and the primary uplink upstream signal.

Example 9 includes the signal interface unit of any of Examples 1-8, wherein the signal interface unit is configured to convert the uplink downstream signal into the primary uplink upstream signal by converting between two distinct framing structures.

Example 10 includes the signal interface unit of any of Examples 1-9, wherein at least one of the uplink downstream signal and the primary uplink upstream signal includes I/Q pairs.

Example 11 includes the signal interface unit of any of Examples 1-10, wherein the signal interface unit is configured to convert the uplink downstream signal into the primary uplink upstream signal by converting from a first baseband representation to a second baseband representation.

Example 12 includes the signal interface unit of any of Examples 1-11, wherein the signal interface unit is configured to convert the uplink downstream signal into the primary uplink upstream signal by converting from an analog signal into a digital signal.

Example 13 includes the signal interface unit of any of Examples 1-12, wherein the upstream device is a base station configured to receive the primary uplink upstream signal and the at least one emulated-diversity uplink upstream signal.

Example 14 includes the signal interface unit of any of Examples 1-13, wherein the primary uplink upstream signal and the at least one emulated-diversity uplink upstream signal are formatted according to at least one of a Common Public Radio Interface (CPRI) standard, an Open Base Station Architecture Initiative (OBSAI) standard, and an Open Radio Interface (ORI) standard.

Example 15 includes the signal interface unit of any of Examples 1-14, wherein the base station includes a dual diversity demodulator.

Example 16 includes the signal interface unit of any of Examples 1-15, wherein at least one alarm is triggered by the upstream device if the primary uplink upstream signal is either too similar or too dissimilar from the at least one emulated-diversity uplink upstream signal.

Example 17 includes the signal interface unit of any of Examples 1-16, wherein at least one alarm is triggered by the upstream device if at least a second attribute of the primary uplink upstream signal differs from the at least one attribute of the at least one emulated-diversity uplink upstream signal by at least one of: more than a first threshold; and less than a second threshold.

Example 18 includes the signal interface unit of any of Examples 1-17, wherein the downstream device includes at least one component of a distributed antenna system.

Example 19 includes the signal interface unit of Example 18, wherein at least one component of the distributed antenna system provides the uplink downstream signal to the signal interface unit.

Example 20 includes the signal interface unit of any of Examples 18-19, wherein the distributed antenna system is a digital distributed antenna system including an antenna unit configured to: receive radio frequency signals from a subscriber unit; convert the radio frequency signals into digital signals; and communicate the digital signals through the distributed antenna system and toward the signal interface unit.

Example 21 includes the signal interface unit of any of Examples 18-20, wherein the distributed antenna system is a hybrid distributed antenna system including: an antenna unit configured to: receive radio frequency signals from a subscriber unit; convert the radio frequency signals into analog signals; and communicate the analog signals through the distributed antenna system; and an intermediary device configured to: receive the analog signals from the antenna unit; convert the analog signals into digital signals; and communicate the analog signals through the distributed antenna system and toward the signal interface unit.

Example 22 includes the signal interface unit of any of Examples 18-21, wherein the distributed antenna system is an analog distributed antenna system including an antenna unit configured to: receive radio frequency signals from a subscriber unit; convert the radio frequency signals into analog signals; and communicate the analog signals through the distributed antenna system and toward the signal interface unit.

Example 23 includes the signal interface unit of any of Examples 1-22, wherein the downstream device is at least one of a remote radio head and an antenna.

Example 24 includes a method for emulating uplink diversity signals, comprising: receiving an uplink downstream signal from a downstream device; converting the uplink downstream signal into a primary uplink upstream signal; generating at least one emulated-diversity uplink upstream signal from at least one of the primary uplink upstream signal and the uplink downstream signal; communicating the primary uplink upstream signal and the at least one emulated-diversity uplink upstream signal to an upstream device.

Example 25 includes the method of Example 24, wherein generating the at least one emulated-diversity uplink upstream signal from at least one of the primary uplink upstream signal and the uplink downstream signal includes: copying the primary uplink upstream signal to create the at least one emulated-diversity uplink upstream signal; and adjusting at least one attribute of the at least one emulated-diversity uplink upstream signal such that the at least one emulated-diversity uplink upstream signal is distinct from the primary uplink upstream signal.

Example 26 includes the method of Example 25, wherein the at least one attribute includes at least one gain, delay, and noise.

Example 27 includes the method of any of Examples 25-26, wherein adjusting at least one attribute of the at least one emulated-diversity uplink upstream signal includes digitally adjusting the at least one attribute.

Example 28 includes the method of any of Examples 24-27, wherein generating the at least one emulated-diversity uplink upstream signal from at least one of the primary uplink upstream signal and the uplink downstream signal includes: copying the primary uplink upstream signal to create the at least one emulated-diversity uplink upstream signal; adjusting gain of the at least one emulated-diversity uplink upstream signal; adjusting delay of the at least one emulated-diversity uplink upstream signal; and adjusting noise of the at least one emulated-diversity uplink upstream signal.

Example 29 includes the method of any of Examples 24-28, wherein generating the at least one emulated-diversity uplink upstream signal from at least one of the primary uplink upstream signal and the uplink downstream signal includes: copying the uplink downstream signal into a duplicate uplink downstream signal; adjusting at least one attribute of the duplicate uplink downstream signal; and converting the duplicate uplink downstream signal into the at least one emulated-diversity uplink upstream signal.

Example 30 includes the method of any of Examples 24-29, wherein the at least one emulated-diversity uplink upstream signal includes a plurality of emulated-diversity uplink upstream signals.

Example 31 includes the method of Example 30, further comprising generating each of the plurality of emulated-diversity uplink upstream signals such that all of the plurality of emulated-diversity uplink upstream signals are distinct from each other and the primary uplink upstream signal.

Example 32 includes the method of any of Examples 24-31, wherein converting the uplink downstream signal into the primary uplink upstream signal includes converting between two distinct framing structures.

Example 33 includes the method of any of Examples 24-32, wherein at least one of the uplink downstream signal and the primary uplink upstream signal includes I/Q pairs.

Example 34 includes the method of any of Examples 24-33, wherein converting the uplink downstream signal into the primary uplink upstream signal includes converting from a first baseband representation to a second baseband representation.

Example 35 includes the method of any of Examples 24-34, wherein converting the uplink downstream signal into the primary uplink upstream signal includes converting from an analog signal into a digital signal.

Example 36 includes the method of any of Examples 24-35, wherein the upstream device is a base station configured to receive the primary uplink upstream signal and the at least one emulated-diversity uplink upstream signal.

Example 37 includes the method of any of Examples 24-36, wherein the primary uplink upstream signal and the at least one emulated-diversity uplink upstream signal are formatted according to at least one of a Common Public Radio Interface (CPRI) standard, an Open Base Station Architecture Initiative (OBSAI) standard, and an Open Radio Interface (ORI) standard.

Example 38 includes the method of any of Examples 24-37, further comprising triggering at least one alarm if the primary uplink upstream signal is either too similar or too dissimilar from the at least one emulated-diversity uplink upstream signal.

Example 39 includes the method of any of Examples 24-38, further comprising triggering at least one alarm if at least a second attribute of the primary uplink upstream signal differs from the at least one attribute of the at least one emulated-diversity uplink upstream signal by at least one of: more than a first threshold; and less than a second threshold.

Example 40 includes the method of any of Examples 24-39, wherein the downstream device includes at least one of a component of a distributed antenna system, a remote radio head, and an antenna.

Example 41 includes a signal interface unit for interfacing uplink downstream signals from an antenna unit with a base station, the signal interface unit comprising: a base station interface configured to communicate a primary uplink upstream signal and at least one emulated-diversity uplink upstream signal to a base station; an antenna side interface configured to receive an uplink downstream signal from an antenna unit; wherein the signal interface unit is configured to convert the uplink downstream signal into the primary uplink upstream signal; wherein the signal interface unit is further configured to copy the primary uplink upstream signal into at an emulated-diversity uplink upstream signal and to adjust at least one of gain, delay, and noise of the emulated-diversity uplink upstream signal such that the emulated-diversity uplink upstream signal is distinct from the primary uplink upstream signal.

What is claimed is:

1. A signal interface unit for interfacing uplink downstream signals from a downstream device with an upstream device, the signal interface unit comprising:
    at least one upstream interface configured to communicate a primary uplink upstream signal and at least one emulated-diversity uplink upstream signal to an upstream device;
    a downstream interface configured to receive an uplink downstream signal from a downstream device;
    wherein the signal interface unit is configured to convert the uplink downstream signal into the primary uplink upstream signal;
    wherein the signal interface unit is further configured to generate the at least one emulated-diversity uplink upstream signal from at least one of the primary uplink upstream signal and the uplink downstream signal.

2. The signal interface unit of claim 1, wherein the signal interface unit is configured to generate the at least one emulated-diversity uplink upstream signal by being configured to:
    copy the primary uplink upstream signal to create the at least one emulated-diversity uplink upstream signal; and
    adjust at least one attribute of the at least one emulated-diversity uplink upstream signal such that the at least one emulated-diversity uplink upstream signal is distinct from the primary uplink upstream signal.

3. The signal interface unit of claim 2, wherein the at least one attribute includes at least one gain, delay, and noise.

4. The signal interface unit of claim 2, wherein adjusting at least one attribute of the at least one emulated-diversity uplink upstream signal includes digitally adjusting the at least one attribute.

5. The signal interface unit of claim 1, wherein the signal interface unit is configured to generate the at least one emulated-diversity uplink upstream signal by being configured to:
    copy the primary uplink upstream signal to create the at least one emulated-diversity uplink upstream signal;
    adjust gain of the at least one emulated-diversity uplink upstream signal;
    adjust delay of the at least one emulated-diversity uplink upstream signal; and
    adjust noise of the at least one emulated-diversity uplink upstream signal.

6. The signal interface unit of claim 1, wherein the signal interface unit is configured to generate at least one emulated-diversity uplink upstream signal by being configured to:
    copy the uplink downstream signal into a duplicate uplink downstream signal;
    adjust at least one attribute of the duplicate uplink downstream signal; and
    convert the duplicate uplink downstream signal into the at least one emulated-diversity uplink upstream signal.

7. The signal interface unit of claim 1, wherein the at least one emulated-diversity uplink upstream signal includes a plurality of emulated-diversity uplink upstream signals.

8. The signal interface unit of claim 7, wherein each of the plurality of emulated-diversity uplink upstream signals is generated such that all of the plurality of emulated-diversity uplink upstream signals are distinct from each other and the primary uplink upstream signal.

9. The signal interface unit of claim 1, wherein the signal interface unit is configured to convert the uplink downstream signal into the primary uplink upstream signal by converting between two distinct framing structures.

10. The signal interface unit of claim 1, wherein at least one of the uplink downstream signal and the primary uplink upstream signal includes I/Q pairs.

11. The signal interface unit of claim 1, wherein the signal interface unit is configured to convert the uplink downstream signal into the primary uplink upstream signal by converting from a first baseband representation to a second baseband representation.

12. The signal interface unit of claim 1, wherein the signal interface unit is configured to convert the uplink downstream signal into the primary uplink upstream signal by converting from an analog signal into a digital signal.

13. The signal interface unit of claim 1, wherein the upstream device is a base station configured to receive the primary uplink upstream signal and the at least one emulated-diversity uplink upstream signal.

14. The signal interface unit of claim 1, wherein the primary uplink upstream signal and the at least one emulated-diversity uplink upstream signal are formatted according to at least one of a Common Public Radio Interface (CPRI) standard, an Open Base Station Architecture Initiative (OBSAI) standard, and an Open Radio Interface (ORI) standard.

15. The signal interface unit of claim 1, wherein the base station includes a dual diversity demodulator.

16. The signal interface unit of claim 1, wherein at least one alarm is triggered by the upstream device if the primary uplink upstream signal is either too similar or too dissimilar from the at least one emulated-diversity uplink upstream signal.

17. The signal interface unit of claim 1, wherein at least one alarm is triggered by the upstream device if at least a second attribute of the primary uplink upstream signal differs from the at least one attribute of the at least one emulated-diversity uplink upstream signal by at least one of:
    more than a first threshold; and
    less than a second threshold.

18. The signal interface unit of claim 1, wherein the downstream device includes at least one component of a distributed antenna system.

19. The signal interface unit of claim 18, wherein at least one component of the distributed antenna system provides the uplink downstream signal to the signal interface unit.

20. The signal interface unit of claim 18, wherein the distributed antenna system is a digital distributed antenna system including an antenna unit configured to:
    receive radio frequency signals from a subscriber unit;
    convert the radio frequency signals into digital signals; and
    communicate the digital signals through the distributed antenna system and toward the signal interface unit.

21. The signal interface unit of claim 18, wherein the distributed antenna system is a hybrid distributed antenna system including:
    an antenna unit configured to:
        receive radio frequency signals from a subscriber unit;
        convert the radio frequency signals into analog signals; and
        communicate the analog signals through the distributed antenna system; and
    an intermediary device configured to:
        receive the analog signals from the antenna unit;
        convert the analog signals into digital signals; and
        communicate the analog signals through the distributed antenna system and toward the signal interface unit.

22. The signal interface unit of claim 18, wherein the distributed antenna system is an analog distributed antenna system including an antenna unit configured to:
    receive radio frequency signals from a subscriber unit;
    convert the radio frequency signals into analog signals; and
    communicate the analog signals through the distributed antenna system and toward the signal interface unit.

23. The signal interface unit of claim 1, wherein the downstream device is at least one of a remote radio head and an antenna.

24. A method for emulating uplink diversity signals, comprising:
    receiving an uplink downstream signal from a downstream device;
    converting the uplink downstream signal into a primary uplink upstream signal;
    generating at least one emulated-diversity uplink upstream signal from at least one of the primary uplink upstream signal and the uplink downstream signal;
    communicating the primary uplink upstream signal and the at least one emulated-diversity uplink upstream signal to an upstream device.

25. The method of claim 24, wherein generating the at least one emulated-diversity uplink upstream signal from at least one of the primary uplink upstream signal and the uplink downstream signal includes:
    copying the primary uplink upstream signal to create the at least one emulated-diversity uplink upstream signal; and
    adjusting at least one attribute of the at least one emulated-diversity uplink upstream signal such that the at least one emulated-diversity uplink upstream signal is distinct from the primary uplink upstream signal.

26. The method of claim 25, wherein the at least one attribute includes at least one gain, delay, and noise.

27. The method of claim 25, wherein adjusting at least one attribute of the at least one emulated-diversity uplink upstream signal includes digitally adjusting the at least one attribute.

28. The method of claim 24, wherein generating the at least one emulated-diversity uplink upstream signal from at least one of the primary uplink upstream signal and the uplink downstream signal includes:
    copying the primary uplink upstream signal to create the at least one emulated-diversity uplink upstream signal;
    adjusting gain of the at least one emulated-diversity uplink upstream signal;
    adjusting delay of the at least one emulated-diversity uplink upstream signal; and
    adjusting noise of the at least one emulated-diversity uplink upstream signal.

29. The method of claim 24, wherein generating the at least one emulated-diversity uplink upstream signal from at least one of the primary uplink upstream signal and the uplink downstream signal includes:
    copying the uplink downstream signal into a duplicate uplink downstream signal;
    adjusting at least one attribute of the duplicate uplink downstream signal; and
    converting the duplicate uplink downstream signal into the at least one emulated-diversity uplink upstream signal.

30. The method of claim 24, wherein the at least one emulated-diversity uplink upstream signal includes a plurality of emulated-diversity uplink upstream signals.

31. The method of claim 30, further comprising generating each of the plurality of emulated-diversity uplink upstream signals such that all of the plurality of emulated-diversity uplink upstream signals are distinct from each other and the primary uplink upstream signal.

32. The method of claim 24, wherein converting the uplink downstream signal into the primary uplink upstream signal includes converting between two distinct framing structures.

33. The method of claim 24, wherein at least one of the uplink downstream signal and the primary uplink upstream signal includes I/Q pairs.

34. The method of claim 24, wherein converting the uplink downstream signal into the primary uplink upstream signal includes converting from a first baseband representation to a second baseband representation.

35. The method of claim 24, wherein converting the uplink downstream signal into the primary uplink upstream signal includes converting from an analog signal into a digital signal.

36. The method of claim 24, wherein the upstream device is a base station configured to receive the primary uplink upstream signal and the at least one emulated-diversity uplink upstream signal.

37. The method of claim 24, wherein the primary uplink upstream signal and the at least one emulated-diversity uplink upstream signal are formatted according to at least one of a Common Public Radio Interface (CPRI) standard, an Open Base Station Architecture Initiative (OBSAI) standard, and an Open Radio Interface (ORI) standard.

38. The method of claim 24, further comprising triggering at least one alarm if the primary uplink upstream signal is either too similar or too dissimilar from the at least one emulated-diversity uplink upstream signal.

39. The method of claim 24, further comprising triggering at least one alarm if at least a second attribute of the primary uplink upstream signal differs from the at least one attribute of the at least one emulated-diversity uplink upstream signal by at least one of:
   more than a first threshold; and
   less than a second threshold.

40. The method of claim 24, wherein the downstream device includes at least one of a component of a distributed antenna system, a remote radio head, and an antenna.

41. A signal interface unit for interfacing uplink downstream signals from an antenna unit with a base station, the signal interface unit comprising:
   a base station interface configured to communicate a primary uplink upstream signal and at least one emulated-diversity uplink upstream signal to a base station;
   an antenna side interface configured to receive an uplink downstream signal from an antenna unit;
   wherein the signal interface unit is configured to convert the uplink downstream signal into the primary uplink upstream signal;
   wherein the signal interface unit is further configured to copy the primary uplink upstream signal into at an emulated-diversity uplink upstream signal and to adjust at least one of gain, delay, and noise of the emulated-diversity uplink upstream signal such that the emulated-diversity uplink upstream signal is distinct from the primary uplink upstream signal.

* * * * *